US010368356B2

(12) United States Patent
Lu et al.

(10) Patent No.: US 10,368,356 B2
(45) Date of Patent: Jul. 30, 2019

(54) V2V-BASED RESOURCE ALLOCATION METHOD AND APPARATUS

(71) Applicant: Huawei Technologies Co., Ltd., Shenzhen (CN)

(72) Inventors: Zhenwei Lu, Beijing (CN); Xin Xiong, Beijing (CN); Guanglin Han, Munich (DE); Yao Hua, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 21 days.

(21) Appl. No.: 15/661,958

(22) Filed: Jul. 27, 2017

(65) Prior Publication Data

US 2017/0325214 A1   Nov. 9, 2017

Related U.S. Application Data

(63) Continuation of application No. PCT/CN2015/071643, filed on Jan. 27, 2015.

(51) Int. Cl.
*H04W 72/04* (2009.01)
*H04W 4/00* (2018.01)
(Continued)

(52) U.S. Cl.
CPC ............ *H04W 72/048* (2013.01); *H04W 4/70* (2018.02); *H04W 72/042* (2013.01);
(Continued)

(58) Field of Classification Search
CPC ..... H04W 76/14; H04W 72/10; H04W 72/02; H04W 72/04; H04W 8/005;
(Continued)

(56) References Cited

U.S. PATENT DOCUMENTS

2008/0279139 A1   11/2008 Beziot et al.
2009/0161644 A1   6/2009 Suzuki et al.
(Continued)

FOREIGN PATENT DOCUMENTS

| CN | 103229580 A | 7/2013 |
| CN | 104079503 A | 10/2014 |

(Continued)

OTHER PUBLICATIONS

"Resource pool selection with group priority," 3GPP TSG RAN WG2 Meeting #88 San Francisco, USA, R2-145078, XP050877195, 3rd Generation Partnership Project, Valbonne, France (Nov. 17-21, 2014).

(Continued)

*Primary Examiner* — Awet Haile
(74) *Attorney, Agent, or Firm* — Leydig, Voit & Mayer, Ltd.

(57) ABSTRACT

Embodiments of the present invention relate to a V2V-based resource allocation method and apparatus. The method includes: receiving a resource request message sent by first user equipment; identifying, according to the resource request message, a level type corresponding to the first user equipment; if the level type is a high priority type, and a quantity of blocks of idle V2V resources in a first resource pool is less than a first preset threshold, or a quantity of required resource blocks that is calculated and a modulation and coding scheme is greater than a quantity of blocks of idle V2V resources in a first resource pool, allocating a V2V resource to the first user equipment. By means of the V2V-based resource allocation method and apparatus, quality of service of user equipment of a high priority type can be ensured.

12 Claims, 10 Drawing Sheets

(51) Int. Cl.
*H04W 76/14* (2018.01)
*H04W 4/70* (2018.01)
*H04W 72/10* (2009.01)
*H04W 76/36* (2018.01)

(52) U.S. Cl.
CPC .......... *H04W 72/10* (2013.01); *H04W 76/14* (2018.02); *H04W 76/36* (2018.02)

(58) Field of Classification Search
CPC ..... H04W 8/0446; H04W 4/70; H04W 92/18; H04W 72/048; H04W 88/02; H04W 72/12; H04W 48/16; H04W 72/0453; H04W 36/03; H04W 48/06; H04W 72/1247; H04L 47/76; H04L 47/805
See application file for complete search history.

(56) References Cited

U.S. PATENT DOCUMENTS

| | | | |
|---|---|---|---|
| 2012/0195216 A1* | 8/2012 | Wu | H04W 72/0486 370/252 |
| 2014/0137104 A1 | 5/2014 | Nelson et al. | |
| 2016/0057604 A1 | 2/2016 | Luo et al. | |
| 2017/0013608 A1 | 1/2017 | Du et al. | |
| 2017/0295567 A1* | 10/2017 | Chen | H04W 76/11 |

FOREIGN PATENT DOCUMENTS

| | | |
|---|---|---|
| CN | 104113851 A | 10/2014 |
| EP | 2938033 A1 | 10/2015 |
| JP | 2007520131 A | 7/2007 |
| JP | 2009159098 A | 7/2009 |
| WO | 2014082533 A1 | 6/2014 |
| WO | 2014169695 A1 | 10/2014 |
| WO | 2014187409 A1 | 11/2014 |

OTHER PUBLICATIONS

"Multiple Transmission Pools for ProSe Communications," 3GPP TSG RAN WG2 Meeting #88 San Francisco, USA, R2-145204, XP050877287, 3rd Generation Partnership Project, Valbonne, France (Nov. 17-21, 2014).

"On Resource Allocation and System Operation for D2D Discovery," 3GPP TSG RAN WG1 Meeting #74bis Guangzhou, China, R1-134141, XP050717331, 3rd Generation Partnership Project, Valbonne, France (Oct. 7-11, 2013).

"Mode 1 resource allocation for D2D broadcast communication," 3GPP TSG RAN WG1 Meeting #77, R1-142112, XP050789232, 3rd Generation Partnership Project, Valbonne, France (May 19-23, 2014).

* cited by examiner

V2V-BASED RESOURCE ALLOCATION METHOD AND APPARATUS

CROSS-REFERENCE TO RELATED APPLICATIONS

This application is a continuation of International Application No. PCT/CN2015/071643, filed on Jan. 27, 2015, the disclosure of which is hereby incorporated by reference in its entirety.

TECHNICAL FIELD

Embodiments of the present invention relate to wireless communications technologies, and in particular, to a V2V-based resource allocation method and apparatus.

BACKGROUND

In a Vehicle to Vehicle (V2V for short) communications technology, user equipments are connected by using in-vehicle intelligent terminal devices, to form a wireless ad hoc communications network, so as to implement mutual communication between the user equipments. User equipment may send or receive a security-concerned message in time by using the V2V technology, for example, may broadcast a security-concerned message of the user equipment, for example, a speed, a location, a driving direction, or emergency brake of the user equipment, to surrounding user equipment, to improve the use efficiency of road traffic, and ensure security of vehicle driving.

In the conventional art, user equipments may be classified into user equipment of a high priority type and user equipment of a low priority type according to functions and/or executed tasks of the user equipments. For example, user equipment configured to execute an emergent task is classified as user equipment of a high priority type, for example, an ambulance, or a fire engine. Both the user equipment of the high priority type and the user equipment of the low priority type need to first obtain V2V resources when sending a security-concerned message by using the V2V communications technology. However, when V2V resources are insufficient, the user equipment of the high priority type may not obtain a V2V resource. Consequently, a message of the user equipment of the high priority type cannot be sent in time, and further, quality of service of the user equipment of the high priority type cannot be ensured.

SUMMARY

Embodiments of the present invention provide a V2V-based resource allocation method and apparatus, to ensure quality of service of high-priority user equipment.

According to a first aspect, an embodiment of the present invention provides a V2V-based resource allocation method, including:

receiving, by a base station, a resource request message sent by first user equipment;

identifying, by the base station according to the resource request message, a level type corresponding to the first user equipment; and if the base station identifies that the level type corresponding to the first user equipment is a high priority type, and a quantity of blocks of idle V2V resources having a same size in a first resource pool is less than a first preset threshold, or a quantity of required resource blocks that is calculated by the base station according to an amount of data to be sent by the first user equipment and a modulation and coding scheme is greater than a quantity of blocks of idle V2V resources in the first resource pool, allocating a V2V resource to the first user equipment from V2V resources occupied by second user equipment in the first resource pool or from a second resource pool corresponding to another type other than the high priority type, where the V2V resource is used by the first user equipment to transmit V2V data, the first resource pool is a resource pool corresponding to the high priority type, and the second user equipment is user equipment of another type other than the high priority type.

With reference to the first aspect, in a first possible implementation manner of the first aspect, the allocating a V2V resource to the first user equipment from V2V resources occupied by second user equipment in the first resource pool includes:

if determining that a V2V resource in the first resource pool is occupied by the second user equipment, sending, by the base station, a first indication message to the second user equipment, where the first indication message is used to instruct the second user equipment to release the occupied V2V resource in the first resource pool; and allocating, by the base station, the V2V resource to the first user equipment from the V2V resource released by the second user equipment.

With reference to the first aspect, in a second possible implementation manner of the first aspect, the allocating a V2V resource to the first user equipment from a second resource pool corresponding to another type other than the high priority type includes:

if determining that a quantity of blocks of idle V2V resources having a same size in the second resource pool is not less than a second preset threshold, or determining that the quantity of the required resource blocks that is calculated by the base station according to the amount of the data to be sent by the first user equipment and the modulation and coding scheme is less than a quantity of blocks of idle V2V resources in the second resource pool, allocating, by the base station, the V2V resource to the first user equipment from the second resource pool.

With reference to the second possible implementation manner of the first aspect, in a third possible implementation manner of the first aspect, the method further includes:

sending, by the base station, a second indication message to the second user equipment, where the second indication message carries location information of the V2V resource allocated to the first user equipment in the second resource pool, and the second indication message is used to instruct the second user equipment to obtain, according to the location information of the V2V resource, the V2V resource from other V2V resources other than the V2V resource allocated to the first user equipment in the second resource pool.

With reference to the second possible implementation manner of the first aspect or the third possible implementation manner of the first aspect, in a fourth possible implementation manner of the first aspect, after the allocating a V2V resource to the first user equipment, the method further includes:

if determining, every a preset time, that the quantity of the blocks of the idle V2V resources having a same size in the first resource pool is not less than the first preset threshold, or determining, every a preset time, that the quantity of the required resource blocks that is calculated by the base station according to the amount of the data to be sent by the first user equipment and the modulation and coding scheme is less than the quantity of the blocks of the idle V2V resources in the first resource pool, allocating, by the base station, the V2V resource to the first user equipment from the first resource pool, and sending a third indication message to the first user equipment, where the third indication message is used to instruct the first user equipment to release the occupied V2V resource in the second resource pool.

With reference to the fourth possible implementation manner of the first aspect, in a fifth possible implementation manner of the first aspect, the method further includes:

sending, by the base station, a fourth indication message to the second user equipment, where the fourth indication message carries the location information of the V2V resource released by the first user equipment, and the fourth indication message is used to instruct the second user equipment to obtain, according to the location information of the V2V resource, the V2V resource from the second resource pool after the first user equipment releases the occupied V2V resource in the second resource pool.

According to a second aspect, an embodiment of the present invention provides a V2V-based resource allocation method, including:

sending, by user equipment, a resource request message to a base station, where the resource request message is used to instruct the base station to identify a level type corresponding to the user equipment;

obtaining, by the user equipment from the base station, a V2V resource allocated by the base station, where the allocated V2V resource is a V2V resource allocated by the base station, when the base station determines that the level type corresponding to the user equipment is a high priority type, and a quantity of blocks of idle V2V resources having a same size in a first resource pool is less than a first preset threshold, or a quantity of required resource blocks that is calculated by the base station according to an amount of data to be sent by the user equipment and a modulation and coding scheme is greater than a quantity of blocks of idle V2V resources in the first resource pool, from V2V resources occupied by second user equipment in the first resource pool or from a second resource pool corresponding to another type other than the high priority type, the first resource pool is a resource pool corresponding to the high priority type, and the second user equipment is user equipment of another type other than the high priority type; and transmitting, by the user equipment, V2V data according to the allocated V2V resource.

With reference to the second aspect, in a first possible implementation manner of the second aspect, after the obtaining, by the user equipment from the base station, a V2V resource allocated by the base station, the method further includes:

receiving, by the user equipment, a third indication message sent by the base station, where the third indication message is a message generated by the base station when the base station determines, every a preset time, that the quantity of the blocks of the idle V2V resources having a same size in the first resource pool is not less than the first preset threshold, or the quantity of the required resource blocks that is calculated by the base station according to the amount of the data to be sent by the first user equipment and the modulation and coding scheme is less than the quantity of the blocks of the idle V2V resources in the first resource pool; and releasing, by the user equipment, the occupied V2V resource in the second resource pool according to the third indication message, and receiving the V2V resource that is allocated by the base station from the first resource pool.

According to a third aspect, an embodiment of the present invention provides a V2V-based resource allocation method, including:

receiving, by user equipment, a first indication message sent by a base station, where the first indication message is a message that is generated by the base station when the base station determines that a V2V resource in a first resource pool is already occupied by the user equipment, and the first resource pool is a resource pool corresponding to the high priority type; and releasing, by the user equipment, the occupied V2V resource in the first resource pool according to the first indication message.

With reference to the third aspect, in a first possible implementation manner of the third aspect, the method further includes:

receiving, by the user equipment, a second indication message sent by the base station, where the second indication message is a message generated by the base station when the base station determines that a quantity of blocks of idle V2V resources having a same size in a second resource pool is not less than a second preset threshold, or a quantity of required resource blocks that is calculated by the base station according to an amount of data to be sent by the first user equipment and a modulation and coding scheme is less than a quantity of blocks of idle V2V resources in the second resource pool, the second indication message carries location information of a V2V resource allocated by the base station to the first user equipment in the second resource pool, the second resource pool is a resource pool corresponding to another type other than the high priority type, and the first user equipment is user equipment of the high priority type; and obtaining, by the user equipment according to the location information of the V2V resource in the second indication message, the V2V resource from other V2V resources other than the V2V resource occupied by the first user equipment in the second resource pool.

With reference to the third aspect, in a second possible implementation manner of the third aspect, the method further includes:

receiving, by the user equipment, a fourth indication message sent by the base station, where the fourth indication message is a message generated by the base station when the base station determines that a quantity of blocks of idle V2V resources having a same size in the first resource pool is not less than a first preset threshold, or a quantity of required resource blocks that is calculated by the base station according to an amount of data to be sent by the first user equipment and a modulation and coding scheme is less than a quantity of blocks of idle V2V resources in the first resource pool, and the fourth indication message carries location information of a V2V resource released by the first user equipment; and obtaining, by the user equipment according to the location information of the V2V resource in the fourth indication message, the V2V resource from a second resource pool after the first user equipment releases the occupied V2V resource in the second resource pool.

According to a fourth aspect, an embodiment of the present invention provides a V2V-based resource allocation apparatus, including:

a transceiver module, configured to receive a resource request message sent by first user equipment;

an identification module, configured to identify, according to the resource request message sent by the transceiver module, a level type corresponding to the first user equipment; and an allocation module, configured to: when the identification module identifies that the level type corresponding to the first user equipment is a high priority type, and a quantity of blocks of idle V2V resources having a same size in a first resource pool is less than a first preset threshold, or when the identification module identifies that a quantity of required resource blocks that is calculated according to an amount of data to be sent by the first user equipment and a modulation and coding scheme is greater than a quantity of blocks of idle V2V resources in the first resource pool, allocate a V2V resource to the first user equipment from V2V resources occupied by second user equipment in the first resource pool or from a second resource pool corresponding to another type other than the high priority type, where the V2V resource is used by the first user equipment to transmit V2V data, the first resource pool is a resource pool corresponding to the high priority type, and the second user equipment is user equipment of another type other than the high priority type.

With reference to the fourth aspect, in a first possible implementation manner of the fourth aspect, the allocation module includes:

a determining unit, configured to determine whether a V2V resource in the first resource pool is occupied by the second user equipment;

a sending unit, configured to: when the determining unit determines that the V2V resource in the first resource pool is occupied by the second user equipment, send a first indication message to the second user equipment, where the first indication message is used to instruct the second user equipment to release the occupied V2V resource in the first resource pool; and an allocation unit, configured to: after the sending unit sends the first indication message, allocate the V2V resource to the first user equipment from the V2V resource released by the second user equipment.

With reference to the fourth aspect, in a second possible implementation manner of the fourth aspect, the allocation module includes:

a determining unit, configured to: determine whether a quantity of blocks of idle V2V resources having a same size in the second resource pool is not less than a second preset threshold, or determine whether the quantity of the required resource blocks that is calculated according to the amount of the data to be sent by the first user equipment and the modulation and coding scheme is less than a quantity of blocks of idle V2V resources in the second resource pool; and an allocation unit, configured to: when the determining unit determines that the quantity of the blocks of the idle V2V resources having a same size in the second resource pool is not less than the second preset threshold, or when the determining unit determines that the quantity of the required resource blocks that is calculated according to the amount of the data to be sent by the first user equipment and the modulation and coding scheme is less than the quantity of the blocks of the idle V2V resources in the second resource pool, allocate the V2V resource to the first user equipment from the second resource pool.

With reference to the second possible implementation manner of the fourth aspect, in a third possible implementation manner of the fourth aspect, the transceiver module is further configured to send a second indication message to the second user equipment, where the second indication message carries location information of the V2V resource allocated to the first user equipment in the second resource pool, and the second indication message is used to instruct the second user equipment to obtain, according to the location information of the V2V resource, the V2V resource from other V2V resources other than the V2V resource allocated to the first user equipment in the second resource pool.

With reference to the second possible implementation manner of the fourth aspect or and the third possible implementation manner of the fourth aspect, in a fourth possible implementation manner of the fourth aspect, the apparatus further includes a determining module, where the determining module is configured to: determine, every a preset time, whether the quantity of the blocks of the idle V2V resources having a same size in the first resource pool is not less than the first preset threshold, or determine, every a preset time, whether the quantity of the required resource blocks that is calculated according to the amount of the data to be sent by the first user equipment and the modulation and coding scheme is less than the quantity of the blocks of the idle V2V resources in the first resource pool;

the allocation module is further configured to: when the determining module determines that the quantity of the blocks of the idle V2V resources having a same size in the first resource pool is not less than the first preset threshold, or when the determining module determines that the quantity of the required resource blocks that is calculated according to the amount of the data to be sent by the first user equipment and the modulation and coding scheme is less than the quantity of the blocks of the idle V2V resources in the first resource pool, allocate the V2V resource to the first user equipment from the first resource pool; and the transceiver module is further configured to: when the determining module determines that the quantity of the blocks of the idle V2V resources having a same size in the first resource pool is not less than the first preset threshold, or when the determining module determines that the quantity of the required resource blocks that is calculated according to the amount of the data to be sent by the first user equipment and the modulation and coding scheme is less than the quantity of the blocks of the idle V2V resources in the first resource pool, send a third indication message to the first user equipment, where the third indication message is used to instruct the first user equipment to release the occupied V2V resource in the second resource pool.

With reference to the fourth possible implementation manner of the fourth aspect, in a fifth possible implementation manner of the fourth aspect, the transceiver module is further configured to send a fourth indication message to the second user equipment, where the fourth indication message carries the location information of the V2V resource released by the first user equipment, and the fourth indication message is used to instruct the second user equipment to obtain, according to the location information of the V2V resource, the V2V resource from the second resource pool after the first user equipment releases the occupied V2V resource in the second resource pool.

According to a fifth aspect, an embodiment of the present invention provides a V2V-based resource allocation apparatus, including:

a transceiver module, configured to send a resource request message to a base station, where the resource request message is used to instruct the base station to identify a level type corresponding to the user equipment; and an obtaining module, configured to: after the transceiver module sends the resource request message to the base station, obtain from the base station, a V2V resource allocated by the base station, where the allocated V2V resource is a V2V resource allocated by the base station, when the base station determines that the level type corresponding to the user equipment is a high priority type, and a quantity of blocks of idle V2V resources having a same size in a first resource pool is less than a first preset threshold, or a quantity of required resource blocks that is calculated by the base station according to an amount of data to be sent by the user equipment and a modulation and coding scheme is greater than a quantity of blocks of idle V2V resources in the first resource pool, from V2V resources occupied by second user equipment in the first resource pool or from a second resource pool corresponding to another type other than the high priority type, the first resource pool is a resource pool corresponding to the high priority type, and the second user equipment is user equipment of another type other than the high priority type, where the transceiver module is further configured to transmit V2V data according to the V2V resource obtained by the obtaining module.

With reference to the fifth aspect, in a first possible implementation manner of the fifth aspect, the transceiver module is further configured to receive a third indication message sent by the base station, where the third indication message is a message generated by the base station when the base station determines, every a preset time, that the quantity of the blocks of the idle V2V resources having a same size in the first resource pool is not less than the first preset threshold, or the quantity of the required resource blocks that is calculated by the base station according to the amount of the data to be sent by the first user equipment and the modulation and coding scheme is less than the quantity of the blocks of the idle V2V resources in the first resource pool;

the apparatus further includes a processing module, where the processing module is configured to release the occupied V2V resource in the second resource pool according to the third indication message received by the transceiver module; and the transceiver module is further configured to receive the V2V resource that is allocated by the base station from the first resource pool.

According to a sixth aspect, an embodiment of the present invention provides a V2V-based resource allocation apparatus, including:

a transceiver module, configured to receive a first indication message sent by a base station, where the first indication message is a message that is generated by the base station when the base station determines that a V2V resource in a first resource pool is already occupied by the user equipment, and the first resource pool is a resource pool corresponding to the high priority type; and a processing module, configured to release the occupied V2V resource in the first resource pool according to the first indication message received by the transceiver module.

With reference to the sixth aspect, in a first possible implementation manner of the sixth aspect, the transceiver module is further configured to receive a second indication message sent by the base station, where the second indication message is a message generated by the base station when the base station determines that a quantity of blocks of idle V2V resources having a same size in a second resource pool is not less than a second preset threshold, or a quantity of required resource blocks that is calculated by the base station according to an amount of data to be sent by the first user equipment and a modulation and coding scheme is less than a quantity of blocks of idle V2V resources in the second resource pool, the second indication message carries location information of a V2V resource allocated by the base station to the first user equipment in the second resource pool, the second resource pool is a resource pool corresponding to another type other than the high priority type, and the first user equipment is user equipment of the high priority type; and the apparatus further includes an obtaining module, where the obtaining module is configured to obtain, according to the location information of the V2V resource in the second indication message received by the transceiver module, the V2V resource from other V2V resources other than the V2V resource occupied by the first user equipment in the second resource pool.

With reference to the sixth aspect, in a second possible implementation manner of the sixth aspect, the transceiver module is further configured to receive a fourth indication message sent by the base station, where the fourth indication message is a message generated by the base station when the base station determines that a quantity of blocks of idle V2V resources having a same size in the first resource pool is not less than a first preset threshold, or a quantity of required resource blocks that is calculated by the base station according to an amount of data to be sent by the first user equipment and a modulation and coding scheme is less than a quantity of blocks of idle V2V resources in the first resource pool, and the fourth indication message carries location information of a V2V resource released by the first user equipment; and the apparatus further includes an obtaining module, where the obtaining module is configured to obtain, according to the location information of the V2V resource in the fourth indication message received by the transceiver module, the V2V resource from a second resource pool after the first user equipment releases the occupied V2V resource in the second resource pool.

According to a seventh aspect, an embodiment of the present invention provides a base station, including:

a receiver, configured to receive a resource request message sent by first user equipment; and a processor, configured to identify, according to the resource request message received by the receiver, a level type corresponding to the first user equipment, where the processor is further configured to: when identifying that the level type corresponding to the first user equipment is a high priority type, and a quantity of blocks of idle V2V resources having a same size in a first resource pool is less than a first preset threshold, or when identifying that a quantity of required resource blocks that is calculated according to an amount of data to be sent by the first user equipment and a modulation and coding scheme is greater than a quantity of blocks of idle V2V resources in the first resource pool, allocate a V2V resource to the first user equipment from V2V resources occupied by second user equipment in the first resource pool or from a second resource pool corresponding to another type other than the high priority type, where the V2V resource is used by the first user equipment to transmit V2V data, the first resource pool is a resource pool corresponding to the high priority type, and the second user equipment is user equipment of another type other than the high priority type.

With reference to the seventh aspect, in a first possible implementation manner of the seventh aspect, the processor is further configured to determine whether a V2V resource in the first resource pool is occupied by the second user equipment;

the base station further includes a transmitter, where the transmitter is configured to: when the processor determines that the V2V resource in the first resource pool is already occupied by the second user equipment, send a first indication message to the second user equipment, where the first indication message is used to instruct the second user equipment to release the occupied V2V resource in the first resource pool; and the processor is further configured to: after the transmitter sends the first indication message, allocate the V2V resource to the first user equipment from the V2V resource released by the second user equipment.

With reference to the seventh aspect, in a second possible implementation manner of the seventh aspect, the processor is further configured to: when determining that a quantity of blocks of idle V2V resources having a same size in the second resource pool is not less than a second preset threshold, or when determining that the quantity of the required resource blocks that is calculated according to the amount of the data to be sent by the first user equipment and the modulation and coding scheme is less than a quantity of blocks of idle V2V resources in the second resource pool, allocate the V2V resource to the first user equipment from the second resource pool.

With reference to the second possible implementation manner of the seventh aspect, in a third possible implementation manner of the seventh aspect, the transceiver module is further configured to send a second indication message to the second user equipment, where the second indication message carries location information of the V2V resource allocated to the first user equipment in the second resource pool, and the second indication message is used to instruct the second user equipment to obtain, according to the location information of the V2V resource, the V2V resource from other V2V resources other than the V2V resource allocated to the first user equipment in the second resource pool.

With reference to the second possible implementation manner of the seventh aspect or the third possible implementation manner of the seventh aspect, in a fourth possible implementation manner of the seventh aspect, the processor is further configured to: when determining, every a preset time, that the quantity of the blocks of the idle V2V resources having a same size in the first resource pool is not less than the first preset threshold, or when determining, every a preset time, that the quantity of the required resource blocks that is calculated according to the amount of the data to be sent by the first user equipment and the modulation and coding scheme is less than the quantity of the blocks of the idle V2V resources in the first resource pool, allocate the V2V resource to the first user equipment from the first resource pool; and the transmitter is further configured to: when the processor determines that the quantity of the blocks of the idle V2V resources having a same size in the first resource pool is not less than the first preset threshold, or the quantity of the required resource blocks that is calculated according to the amount of the data to be sent by the first user equipment and the modulation and coding scheme is less than the quantity of the blocks of the idle V2V resources in the first resource pool, send a third indication message to the first user equipment, where the third indication message is used to instruct the first user equipment to release the occupied V2V resource in the second resource pool.

With reference to the fourth possible implementation manner of the seventh aspect, in a fifth possible implementation manner of the seventh aspect, the transmitter is further configured to send a fourth indication message to the second user equipment, where the fourth indication message carries the location information of the V2V resource released by the first user equipment, and the fourth indication message is used to instruct the second user equipment to obtain, according to the location information of the V2V resource, the V2V resource from the second resource pool after the first user equipment releases the occupied V2V resource in the second resource pool.

According to an eighth aspect, an embodiment of the present invention provides user equipment, including:

a transmitter, configured to send a resource request message to a base station, where the resource request message is used to instruct the base station to identify a level type corresponding to the user equipment; and a receiver, configured to: after the transmitter sends the resource request message, obtain, from the base station, a V2V resource allocated by the base station, where the allocated V2V resource is a V2V resource allocated by the base station, when the base station determines that the level type corresponding to the user equipment is a high priority type, and a quantity of blocks of idle V2V resources having a same size in a first resource pool is less than a first preset threshold, or a quantity of required resource blocks that is calculated by the base station according to an amount of data to be sent by the user equipment and a modulation and coding scheme is greater than a quantity of blocks of idle V2V resources in the first resource pool, from V2V resources occupied by second user equipment in the first resource pool or from a second resource pool corresponding to another type other than the high priority type, the first resource pool is a resource pool corresponding to the high priority type, and the second user equipment is user equipment of another type other than the high priority type, where the transmitter is further configured to transmit V2V data according to the V2V resource received by the receiver.

With reference to the eighth aspect, in a first possible implementation manner of the eighth aspect, the receiver is further configured to receive a third indication message sent by the base station, where the third indication message is a message generated by the base station when the base station determines, every a preset time, that the quantity of the blocks of the idle V2V resources having a same size in the first resource pool is not less than the first preset threshold, or the quantity of the required resource blocks that is calculated by the base station according to the amount of the data to be sent by the first user equipment and the modulation and coding scheme is less than the quantity of the blocks of the idle V2V resources in the first resource pool;

a processor is configured to release the occupied V2V resource in the second resource pool according to the third indication message received by the receiver; and the receiver is further configured to receive the V2V resource that is allocated by the base station from the first resource pool.

According to a ninth aspect, an embodiment of the present invention provides user equipment, including:

a receiver, configured to receive a first indication message sent by a base station, where the first indication message is a message that is generated by the base station when the base station determines that a V2V resource in a first resource pool is already occupied by the user equipment, and the first resource pool is a resource pool corresponding to the high priority type; and a processor, configured to release the occupied V2V resource in the first resource pool according to the first indication message received by the receiver.

With reference to the ninth aspect, in a first possible implementation manner of the ninth aspect, the receiver is further configured to receive a second indication message sent by the base station, where the second indication message is a message generated by the base station when the base station determines that a quantity of blocks of idle V2V resources having a same size in a second resource pool is not less than a second preset threshold, or a quantity of required resource blocks that is calculated by the base station according to an amount of data to be sent by the first user equipment and a modulation and coding scheme is less than a quantity of blocks of idle V2V resources in the second resource pool, the second indication message carries location information of a V2V resource allocated by the base station to the first user equipment in the second resource pool, the second resource pool is a resource pool corresponding to another type other than the high priority type, and the first user equipment is user equipment of the high priority type; and the processor is configured to obtain, according to the location information of the V2V resource in the second indication message received by the receiver, the V2V resource from other V2V resources other than the V2V resource occupied by the first user equipment in the second resource pool.

With reference to the ninth aspect, in a second possible implementation manner of the ninth aspect, the receiver is further configured to receive a fourth indication message sent by the base station, where the fourth indication message is a message generated by the base station when the base station determines that a quantity of blocks of idle V2V resources having a same size in the first resource pool is not less than a first preset threshold, or a quantity of required resource blocks that is calculated by the base station according to an amount of data to be sent by the first user equipment and a modulation and coding scheme is less than a quantity of blocks of idle V2V resources in the first resource pool, and the fourth indication message carries location information of a V2V resource released by the first user equipment; and the processor is further configured to obtain, according to the location information of the V2V resource in the fourth indication message received by the receiver, the V2V resource from the second resource pool after the first user equipment releases the occupied V2V resource in the second resource pool.

In the V2V-based resource allocation method and apparatus provided in the embodiments of the present invention, a base station receives a resource request message sent by first user equipment; identifies, according to the resource request message, a level type corresponding to the first user equipment; and if identifying that the level type corresponding to the first user equipment is a high priority type, and a quantity of blocks of idle V2V resources having a same size in a first resource pool is less than a first preset threshold, or a quantity of required resource blocks that is calculated by the base station according to an amount of data to be sent by the first user equipment and a modulation and coding scheme is greater than a quantity of blocks of idle V2V resources in a first resource pool, allocates a V2V resource to the first user equipment from V2V resources occupied by second user equipment in the first resource pool or from a second resource pool corresponding to another type other than the high priority type, where the V2V resource is used by the first user equipment to transmit V2V data, the first resource pool is a resource pool corresponding to the high priority type, and the second user equipment is user equipment of another type other than the high priority type. When the quantity of the blocks of the idle V2V resources having a same size in the first resource pool is less than the first preset threshold, or the quantity of the required resource blocks that is calculated by the base station according to the amount of the data to be sent by the first user equipment and the modulation and coding scheme is greater than the quantity of the blocks of the idle V2V resources in the first resource pool, the V2V resource is scheduled for the first user equipment from the V2V resource occupied by the second user equipment in the first resource pool or from the second resource pool, thereby resolving a technical problem that quality of service of user equipment of a high priority type cannot be ensured, and avoiding a case in the conventional art in which the user equipment of the high priority type cannot obtain a V2V resource when V2V resources are insufficient. Therefore, when the V2V resources are insufficient, the user equipment of the high priority type may preferentially obtain a V2V resource, thereby ensuring that a message of the user equipment of the high priority type can be sent in time, and better ensuring the quality of service of the high-priority user equipment.

BRIEF DESCRIPTION OF DRAWINGS

To describe the technical solutions in the embodiments of the present invention more clearly, the following briefly describes the accompanying drawings required for describing the embodiments or the conventional art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
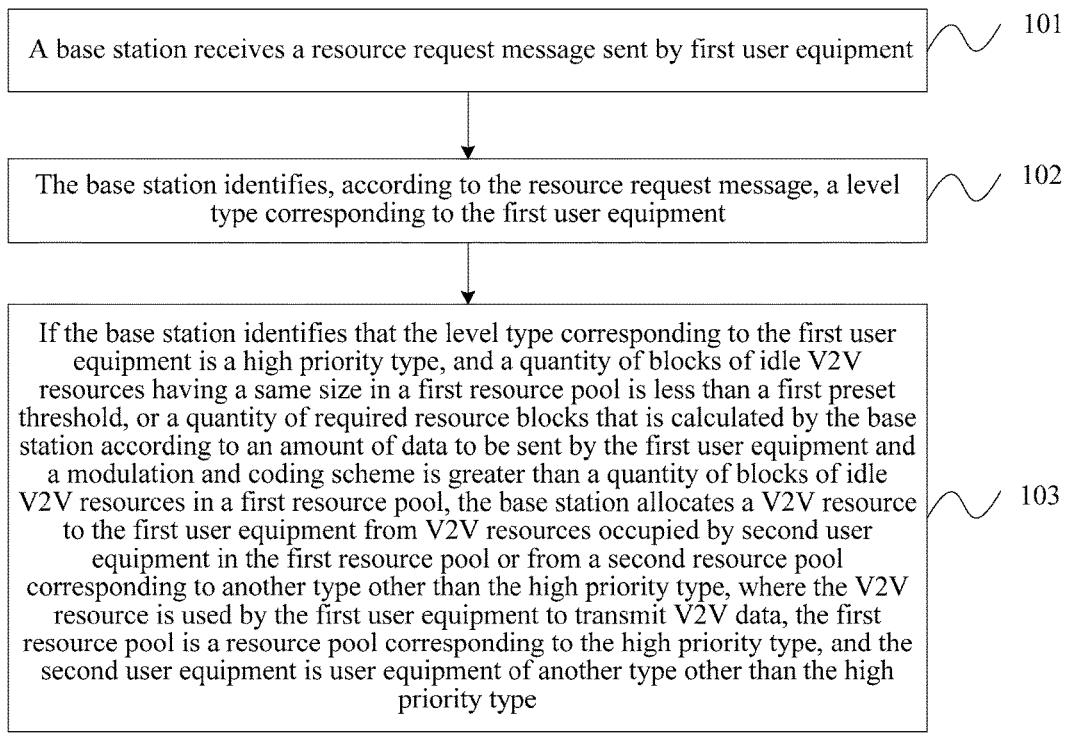
FIG. 1 is a schematic flowchart of a V2V-based resource allocation method according to an embodiment of the present invention.

FIG. 1 is a schematic flowchart of a V2V-based resource allocation method according to an embodiment of the present invention. This embodiment of the present invention provides the V2V-based resource allocation method. The method may be executed by any apparatus executing the V2V-based resource allocation method. The apparatus may be implemented by means of software and/or hardware. In this embodiment, the apparatus may be integrated into a base station. As shown in FIG. 1, the method in this embodiment may include the following steps.

Step 101: The base station receives a resource request message sent by first user equipment.

In this embodiment, the first user equipment may be, for example, a vehicle. Before sending the resource request message to the base station, the first user equipment first needs to send a radio resource control (RRC for short) connection establishment request message to the base station, so that the base station establishes a connection to the first user equipment according to the RRC connection establishment request message. After the base station successfully establishes the connection to the first user equipment, the base station may allocate identity information to the first user equipment. The identity information may be, for example, a cell radio network temporary identifier (C-RNTI for short). The first user equipment sends the resource request message to the base station according to the identity information allocated by the base station, so that the base station allocates a V2V resource to the first user equipment.

Step 102: The base station identifies, according to the resource request message, a level type corresponding to the first user equipment.

In this embodiment, after receiving the resource request message sent by the first user equipment, the base station identifies, according to the resource request message, the level type corresponding to the first user equipment. In a specific implementation process, the first user equipment may add, to the RRC connection establishment request message, user equipment identifier information used to identify a level type of user equipment, and send the RRC connection establishment request message to the base station; or after the first user equipment and the base station establish the connection, add user equipment identifier information to other RRC signaling and report the RRC signaling to the base station; or add user equipment identifier information to the resource request message and send the resource request message to the base station. When the first user equipment adds the user equipment identifier information to the resource request message and sends the resource request message to the base station, the first user equipment may report the resource request message by using a subheader corresponding to a buffer status report (BSR for short). Specifically, a logical channel ID (LCID for short) is an identifier in the BSR reported by the first user equipment. R in the LCID is a reserved bit, and the user equipment identifier information may be written into the R bit and reported to the base station. A manner of reporting, by the first user equipment, the user equipment identifier information to the base station is not particularly limited in this embodiment. In addition, the level type of the user equipment may include but is not limited to a high priority type and another type other than the high priority type.

Step 103: If the base station identifies that the level type corresponding to the first user equipment is a high priority type, and a quantity of blocks of idle V2V resources having a same size in a first resource pool is less than a first preset threshold, or a quantity of required resource blocks that is calculated by the base station according to an amount of data to be sent by the first user equipment and a modulation and coding scheme is greater than a quantity of blocks of idle V2V resources in a first resource pool, the base station allocates a V2V resource to the first user equipment from V2V resources occupied by second user equipment in the first resource pool or from a second resource pool corresponding to another type other than the high priority type, where the V2V resource is used by the first user equipment to transmit V2V data, the first resource pool is a resource pool corresponding to the high priority type, and the second user equipment is user equipment of another type other than the high priority type.

In this embodiment, user equipments may be classified into user equipment of a high priority type and user equipment of another type other than the high priority type. For example, the user equipment of the high priority type is user equipment used in emergency circumstances, for example, a fire engine or an ambulance, or may be user equipment of another type sending a high-priority security-concerned message to another user equipment. A type of user equipment may be pre-configured before delivery, or may be configured afterwards. It should be noted that when the user equipment of another type other than the high priority type sends a high-priority security-concerned message, the user equipment not only needs to report user equipment identifier information used to identify a level type of user equipment to the base station, but also needs to report message identifier information used to identify a level type of a message to the base station. When the base station receives the message identifier information and identifies that the message is a high-priority message, the base station may temporarily consider the user equipment of another type other than the high priority type as user equipment of the high priority type.

In addition, under coverage of the base station, the base station may classify V2V resources into a V2V resource in the first resource pool corresponding to the high priority type and a V2V resource in the second resource pool corresponding to another type other than the high priority type. The user equipment of the high priority type transmits V2V data by using a V2V resource in the first resource pool, that is, sends a security-concerned message to another user equipment, and the user equipment of another type other than the high priority type transmits V2V data by using a V2V resource in the second resource pool.

When the base station identifies that the first user equipment is the user equipment of the high priority type, the base station detects whether the quantity of the blocks of the idle V2V resources having a same size in the first resource pool is less than the first preset threshold, or whether the quantity of the required resource blocks that is calculated by the base station according to the amount of the data to be sent by the first user equipment and the modulation and coding scheme is greater than the quantity of blocks of the idle V2V resources in the first resource pool; and if the quantity of the blocks of the idle V2V resources having a same size in the first resource pool is less than the first preset threshold, or the quantity of the required resource blocks is greater than the quantity of blocks of the idle V2V resources in the first resource pool, selects an idle V2V resource from the V2V resources occupied by the second user equipment of another type other than the high priority type in the first resource pool or from the second resource pool, and allocates the idle V2V resource to the first user equipment. After receiving the V2V resource allocated by the base station, the first user equipment performs V2V communication with another user equipment according to the allocated V2V resource, thereby ensuring that a message of the first user equipment can be sent in time. It should be noted that sizes of idle V2V resource blocks in the first resource pool may be the same or may be different. The first preset threshold may be set according to actual statuses, and a specific value of the first preset threshold is not particularly limited in the present invention.

In the V2V-based resource allocation method provided in this embodiment of the present invention, a base station receives a resource request message sent by first user equipment; identifies, according to the resource request message, a level type corresponding to the first user equipment; and if identifying that the level type corresponding to the first user equipment is a high priority type, and a quantity of blocks of idle V2V resources having a same size in a first resource pool is less than a first preset threshold, or a quantity of required resource blocks that is calculated by the base station according to an amount of data to be sent by the first user equipment and a modulation and coding scheme is greater than a quantity of blocks of idle V2V resources in a first resource pool, allocates a V2V resource to the first user equipment from V2V resources occupied by second user equipment in the first resource pool or from a second resource pool corresponding to another type other than the high priority type, where the V2V resource is used by the first user equipment to transmit V2V data, the first resource pool is a resource pool corresponding to the high priority type, and the second user equipment is user equipment of another type other than the high priority type. When the quantity of the blocks of the idle V2V resources having a same size in the first resource pool is less than the first preset threshold, or the quantity of the required resource blocks that is calculated by the base station according to the amount of the data to be sent by the first user equipment and the modulation and coding scheme is greater than the quantity of the blocks of the idle V2V resources in the first resource pool, the V2V resource is scheduled for the first user equipment from the V2V resource occupied by the second user equipment in the first resource pool or from the second resource pool, thereby resolving a technical problem that quality of service of user equipment of a high priority type cannot be ensured, and avoiding a case in the conventional art in which the user equipment of the high priority type cannot obtain a V2V resource when V2V resources are insufficient. Therefore, when the V2V resources are insufficient, the user equipment of the high priority type may preferentially obtain a V2V resource, thereby ensuring that a message of the user equipment of the high priority type can be sent in time, and better ensuring the quality of service of the high-priority user equipment.

Optionally, in the foregoing method embodiment, if the base station identifies that the level type corresponding to the first user equipment is the high priority type, and the quantity of the blocks of the idle V2V resources having a same size in the first resource pool is not less than the first preset threshold, or the quantity of the required resource blocks that is calculated by the base station according to the amount of the data to be sent by the first user equipment and the modulation and coding scheme is not greater than the quantity of the blocks of the idle V2V resources in the first resource pool, the base station allocates the V2V resource to the first user equipment from the first resource pool.

Specifically, when the base station receives the resource request message sent by the first user equipment, and identifies, according to the resource request message, that the level type corresponding to the first user equipment is the high priority type, the base station queries an idle resource table; and if determining that the quantity of the blocks of the idle V2V resources having a same size in the first resource pool is not less than the first preset threshold, or the quantity of the required resource blocks that is calculated by the base station according to the amount of the data to be sent by the first user equipment and the modulation and coding scheme is not greater than the quantity of the blocks of the idle V2V resources in the first resource pool, selects an idle V2V resource from the first resource pool, allocates the idle V2V resource to the first user equipment, records identity information of the first user equipment, the user equipment identifier information, and location information of the allocated V2V resource in the first resource pool in a resource allocation table, and deletes a related record of the V2V resource in the idle resource table, so that the base station allocates a resource next time.

Figure 2:
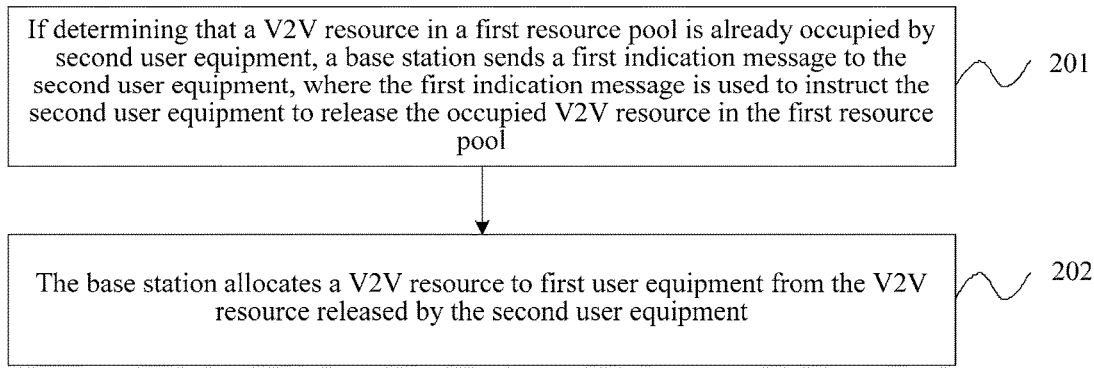
FIG. 2 is a schematic flowchart of a V2V-based resource allocation method according to another embodiment of the present invention.

FIG. 2 is a schematic flowchart of a V2V-based resource allocation method according to another embodiment of the present invention. Based on the embodiment shown in FIG. 1, in this embodiment, an embodiment of allocating the V2V resource to the first user equipment from the V2V resource occupied by the second user equipment in the first resource pool is described in detail. As shown in FIG. 2, the method in this embodiment may include the following steps.

Step 201: If determining that a V2V resource in the first resource pool is already occupied by the second user equipment, the base station sends a first indication message to the second user equipment, where the first indication message is used to instruct the second user equipment to release the occupied V2V resource in the first resource pool.

In this embodiment, under coverage of the base station, the first user equipment obtains the V2V resource in the first resource pool in a manner of scheduling by the base station, and the second user equipment obtains a V2V resource in the second resource pool in a manner of contention. When V2V resources in the second resource pool are insufficient, that is, a quantity of blocks of idle V2V resources having a same size in the second resource pool is less than a second preset threshold, the second user equipment may request, in a manner of sending a resource request message to the base station, the base station to allocate the V2V resource to the second user equipment from the first resource pool. A process in which the second user equipment and the base station establish a connection and a manner in which the second user equipment reports, to the base station, user equipment identifier information used to identify a type of user equipment are similar to those of the first user equipment, and details are not described herein again. When the base station identifies that a type corresponding to the second user equipment is another type other than the high priority type, the base station determines, by querying the idle resource table, whether the quantity of the blocks of the idle V2V resources having a same size in the first resource pool is less than the first preset threshold, or determines, by querying the idle resource table, whether the quantity of the required resource blocks that is calculated according to the amount of the data to be sent by the first user equipment and the modulation and coding scheme is greater than the quantity of the blocks of the idle V2V resources in the first resource pool. If the quantity of the blocks of the idle V2V resources having a same size in the first resource pool is less than the first preset threshold, or the calculated quantity of the required resource blocks is greater than the quantity of the blocks of the idle V2V resources in the first resource pool, the base station sends a resource allocation refusal message to the second user equipment. After receiving the resource allocation refusal message, the second user equipment re-attempts to contend for a V2V resource in the second resource pool, and within a preset time period afterwards, the second user equipment cannot send the resource request message to the base station, to avoid that when the V2V resources in the second resource pool are insufficient, because the second user equipment frequently sends the resource request message to the base station, resource wastes are caused. The second preset threshold and the preset time period may be set according to actual statuses, and this is not particularly limited in this embodiment. If the base station knows by means of querying that the quantity of the blocks of the idle V2V resources having a same size in the first resource pool is not less than the first preset threshold, or the calculated quantity of the required resource blocks is less than the quantity of the blocks of the idle V2V resources in the first resource pool, the base station selects a V2V resource from the idle V2V resource, and allocates the V2V resource to the second user equipment, so that the second user equipment transmits V2V data according to the allocated V2V resource. In addition, the base station records identity information of the second user equipment, user equipment identifier information, and location information of the allocated V2V resource in the first resource pool in the resource allocation table, and deletes a related record of the V2V resource in the idle resource table, so that the base station performs querying next time when allocating a resource.

In this case, if the first user equipment sends the resource request message to the base station to request the base station to allocate the V2V resource, when the base station identifies that the level type corresponding to the first user equipment is the high priority type, the base station queries the idle resource table, to determine whether the quantity of the blocks of the idle V2V resources having a same size in the first resource pool is not less than the first preset threshold, or determine whether the quantity of the required resource blocks that is calculated according to the amount of the data to be sent by the first user equipment and the modulation and coding scheme is not greater than the quantity of the blocks of the idle V2V resources in the first resource pool; if the quantity of the blocks of the idle V2V resources having a same size in the first resource pool is not less than the first preset threshold, or the quantity of the required resource blocks is not greater than the quantity of the blocks of the idle V2V resources in the first resource pool, selects a V2V resource from the first resource pool and allocates the V2V resource to the first user equipment; if the quantity of the blocks of the idle V2V resources having a same size in the first resource pool is less than the first preset threshold, or the quantity of the required resource blocks is greater than the quantity of the blocks of the idle V2V resources in the first resource pool, the base station queries the resource allocation table, to determine whether there is second user equipment occupying a V2V resource in the first resource pool. When the base station determines that the second user equipment occupies the V2V resource in the first resource pool, the base station sends a first indication message to at least one second user equipment occupying the V2V resource in the first resource pool. After receiving the first indication message, the second user equipment releases, according to the first indication message, the occupied V2V resource in the first resource pool, and re-attempts to obtain a V2V resource from the second resource pool.

Step 202: The base station allocates the V2V resource to the first user equipment from the V2V resource released by the second user equipment.

In this embodiment, after the second user equipment releases the occupied V2V resource in the first resource pool, the base station selects the V2V resource from the V2V resource released by the second user equipment, allocates the V2V resource to the first user equipment, records the identity information of the first user equipment, the user equipment identifier information, and the location information of the allocated V2V resource in the resource allocation table, and deletes related information of the V2V resource occupied by the second user equipment in the first resource pool. The first user equipment transmits V2V data according to the allocated V2V resource, to broadcast a security-concerned message to another user equipment.

Optionally, after releasing the occupied V2V resource in the first resource pool, the second user equipment may further send a first release message carrying a resource release status to the base station. If the base station determines that the release status in the first release message is that the resource is successfully released, the base station selects a V2V resource from the V2V resource released by the second user equipment and allocates the V2V resource to the first user equipment, thereby ensuring reliability of obtaining, by the first user equipment, the V2V resource.

In the V2V-based resource allocation method provided in this embodiment of the present invention, a base station receives a resource request message sent by first user equipment; identifies, according to the resource request message, a level type corresponding to the first user equipment; and if identifying that the level type corresponding to the first user equipment is a high priority type, and a quantity of blocks of idle V2V resources having a same size in a first resource pool is less than a first preset threshold, or a quantity of required resource blocks that is calculated by the base station according to an amount of data to be sent by the first user equipment and a modulation and coding scheme is greater than a quantity of blocks of idle V2V resources in a first resource pool, allocates a V2V resource to the first user equipment from V2V resources occupied by second user equipment in the first resource pool or from a second resource pool corresponding to another type other than the high priority type, where the V2V resource is used by the first user equipment to transmit V2V data, the first resource pool is a resource pool corresponding to the high priority type, and the second user equipment is user equipment of another type other than the high priority type. When the quantity of the blocks of the idle V2V resources having a same size in the first resource pool is less than the first preset threshold, or the quantity of the required resource blocks that is calculated by the base station according to the amount of the data to be sent by the first user equipment and the modulation and coding scheme is greater than the quantity of the blocks of the idle V2V resources in the first resource pool, the V2V resource is scheduled for the first user equipment from the V2V resource occupied by the second user equipment in the first resource pool or from the second resource pool, thereby resolving a technical problem that quality of service of user equipment of a high priority type cannot be ensured, and avoiding a case in the conventional art in which the user equipment of the high priority type cannot obtain a V2V resource when V2V resources are insufficient. Therefore, when the V2V resources are insufficient, the user equipment of the high priority type may preferentially obtain a V2V resource, thereby ensuring that a message of the user equipment of the high priority type can be sent in time, and better ensuring the quality of service of the high-priority user equipment. In addition, when the quantity of the idle V2V resources in the second resource pool is less than the second preset threshold, and the quantity of the blocks of the idle V2V resources having a same size in the first resource pool is not less than the first preset threshold, or the quantity of the required resource blocks that is calculated by the base station according to the amount of the data to be sent by the first user equipment and the modulation and coding scheme is less than the quantity of the blocks of the idle V2V resources in the first resource pool, the base station may allocate an idle V2V resource in the first resource pool to the second user equipment. When the first user equipment requests the base station to allocate a V2V resource to the first user equipment, and V2V resources in the first resource pool are insufficient, the second user equipment is scheduled to release the V2V resource in the first resource pool, and the released V2V resource is allocated to the first user equipment, so that V2V resource allocation is more flexible.

Figure 3:
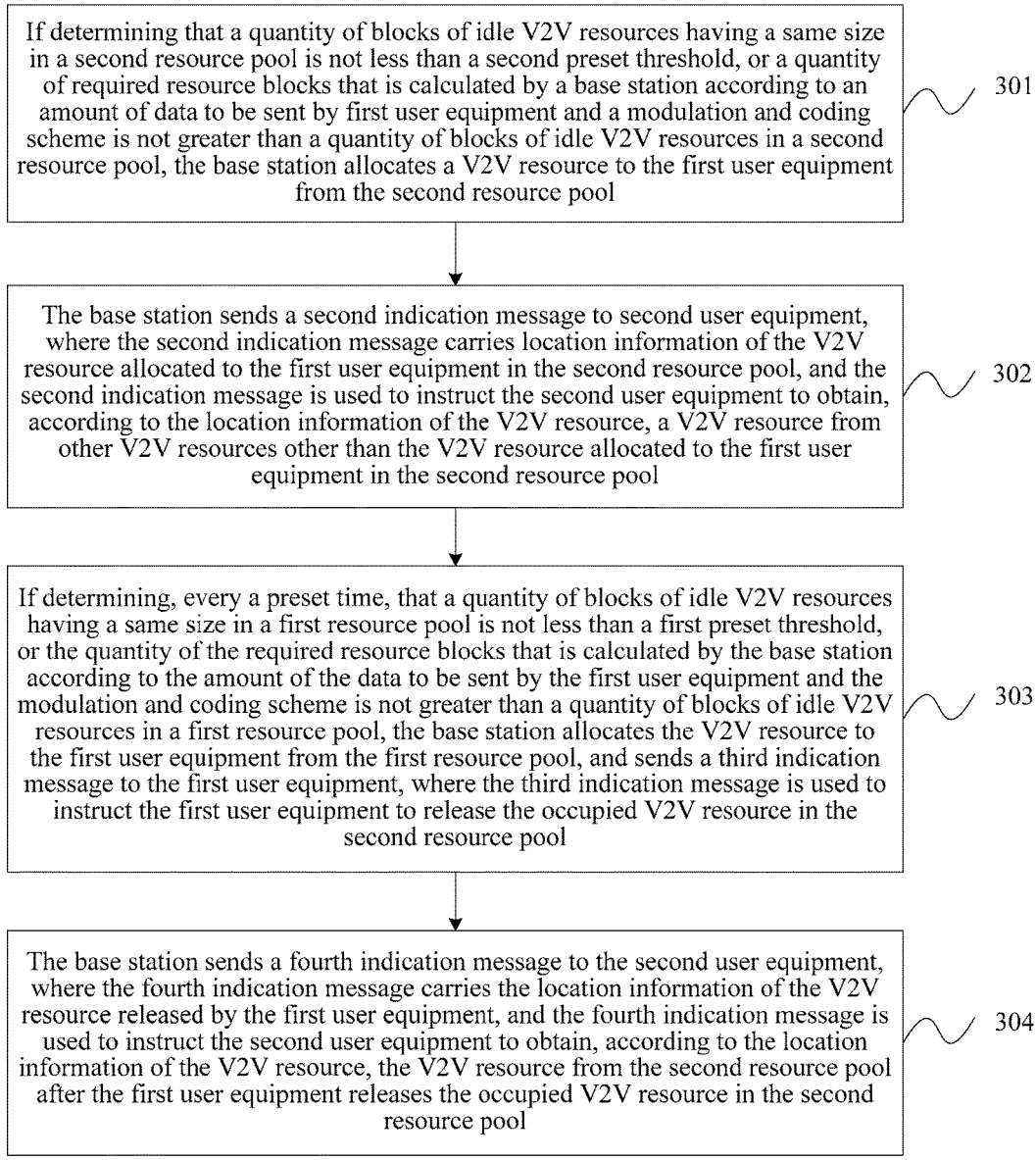
FIG. 3 is a schematic flowchart of a V2V-based resource allocation method according to still another embodiment of the present invention.

FIG. 3 is a schematic flowchart of a V2V-based resource allocation method according to still another embodiment of the present invention. Based on the embodiment shown in FIG. 1, in this embodiment, an embodiment of allocating the V2V resource to the first user equipment from the second resource pool corresponding to another type other than the high priority type is described in detail. As shown in FIG. 3, the method in this embodiment may include the following steps.

Step 301: If determining that a quantity of blocks of idle V2V resources having a same size in the second resource pool is not less than a second preset threshold, or the quantity of the required resource blocks that is calculated by the base station according to the amount of the data to be sent by the first user equipment and the modulation and coding scheme is not greater than a quantity of blocks of idle V2V resources in the second resource pool, the base station allocates the V2V resource to the first user equipment from the second resource pool.

In this embodiment, the first user equipment sends a resource request message to the base station, to request the base station to allocate the V2V resource. After receiving the resource request message, the base station queries the idle resource table. If the base station knows by means of querying that the quantity of the blocks of the idle V2V resources in the first resource pool is less than the first preset threshold, or the quantity of the required resource blocks that is calculated according to the amount of the data to be sent by the first user equipment and the modulation and coding scheme is greater than the quantity of the blocks of the idle V2V resources in the first resource pool, and the quantity of the blocks of the idle V2V resources in the second resource pool is not less than the second preset threshold, or the quantity of the required resource blocks that is calculated by the base station according to the amount of the data to be sent by the first user equipment and the modulation and coding scheme is not greater than the quantity of the blocks of the idle V2V resources in the second resource pool, the base station may select a V2V resource from the second resource pool and allocate the V2V resource to the first user equipment, to improve utilization of the V2V resource in the second resource pool.

Step 302: The base station sends a second indication message to the second user equipment, where the second indication message carries location information of the V2V resource allocated to the first user equipment in the second resource pool, and the second indication message is used to instruct the second user equipment to obtain, according to the location information of the V2V resource, the V2V resource from other V2V resources other than the V2V resource allocated to the first user equipment in the second resource pool.

In this embodiment, after allocating the V2V resource to the first user equipment from the second resource pool, the base station sends the second indication message to the second user equipment. The second indication message is used to instruct the second user equipment not to use the V2V resource allocated to the first user equipment. That is, the second user equipment can contend for a V2V resource only from other V2V resources other than the V2V resource allocated to the first user equipment in the second resource pool, and transmit V2V data according to the obtained V2V resource, to broadcast a security-concerned message to another user equipment. In an actual application process, the base station may modify a system message and send a resource occupation instruction paging message to all second user equipments in a cell, to instruct the second user equipments to receive the second indication message sent by the base station. Therefore, in this case, all second user equipments in the cell cannot contend for or use the V2V resource that is allocated by the base station to the first user equipment from the second resource pool. In addition, the base station may send an indication message to the first user equipment, to notify the first user equipment to add, to the security-concerned message when broadcasting a security-concerned message to the second user equipment, the location information of the V2V resource that is allocated by the base station to the first user equipment from the second resource pool. Therefore, in this case, only second user equipment receiving the security-concerned message cannot contend for the V2V resource that is allocated by the base station to the first user equipment from the second resource pool, and another second user equipment that does not receive the security-concerned message in the cell can still contend for the V2V resource allocated to the first user equipment, and perform V2V communication according to the obtained V2V resource, thereby multiplexing the V2V resource, and improving the resource use efficiency.

Step 303: If determining, every a preset time, that the quantity of the blocks of the idle V2V resources having a same size in the first resource pool is not less than the first preset threshold, or the quantity of the required resource blocks that is calculated by the base station according to the amount of the data to be sent by the first user equipment and the modulation and coding scheme is not greater than the quantity of the blocks of the idle V2V resources in the first resource pool, the base station allocates the V2V resource to the first user equipment from the first resource pool, and sends a third indication message to the first user equipment, where the third indication message is used to instruct the first user equipment to release the occupied V2V resource in the second resource pool.

In this embodiment, after the base station allocates the V2V resource in the second resource pool to the first user equipment and instructs the second user equipment not to use the V2V resource, the base station may query the idle resource table periodically every a preset time, to determine whether the quantity of the blocks of the idle V2V resources in the first resource pool is not less than the first preset threshold, or determine whether the quantity of the required resource blocks that is calculated by the base station according to the amount of the data to be sent by the first user equipment and the modulation and coding scheme is not greater than the quantity of the blocks of the idle V2V resources in the first resource pool; if the quantity of the blocks of the idle V2V resources in the first resource pool is not less than the first preset threshold, or the quantity of the required resource blocks is not greater than the quantity of the blocks of the idle V2V resources in the first resource pool, and a time for which the idle V2V resource is stored in the first resource pool exceeds a preset value, the base station allocates the idle V2V resource obtained through querying in the first resource pool to the first user equipment, and sends the third indication message to the first user equipment, where the third indication message is used to instruct the first user equipment to release the occupied V2V resource in the second resource pool. The preset time period and the preset value are set according to actual statuses, and specific values of the preset time period and the preset value are not particularly limited in this embodiment.

Optionally, when the base station determines that the quantity of the blocks of the idle V2V resources in the first resource pool is not less than the first preset threshold, or the quantity of the required resource blocks that is calculated by the base station according to the amount of the data to be sent by the first user equipment and the modulation and coding scheme is not greater than the quantity of the blocks of the idle V2V resources in the first resource pool, the base station sends the third indication message to the first user equipment, to instruct the first user equipment to release the occupied V2V resource in the second resource pool. After releasing the occupied V2V resource, the first user equipment may further send a second release message to the base station. After receiving the second release message and knowing, by determining a release status of the V2V resource carried in the second release message, that the release status of the V2V resource is success, the base station allocates the idle V2V resource obtained through querying in the first resource pool to the first user equipment, to ensure reliability of obtaining, by the first user equipment, the V2V resource.

Step 304: The base station sends a fourth indication message to the second user equipment, where the fourth indication message carries the location information of the V2V resource released by the first user equipment, and the fourth indication message is used to instruct the second user equipment to obtain, according to the location information of the V2V resource, the V2V resource from the second resource pool after the first user equipment releases the occupied V2V resource in the second resource pool.

In this embodiment, after knowing that the first user equipment successfully releases the occupied V2V in the second resource pool, the base station may send the fourth indication message to the second user equipment. The fourth indication message is used to instruct the second user equipment to contend for and use the V2V resource released by the first user equipment. That is, the second user equipment may obtain the V2V resource from the second resource pool after the first user equipment releases the occupied V2V resource in the second resource pool, and broadcast a security-concerned message according to the obtained V2V resource.

In an actual application process, if the base station sends the second indication message to the second user equipment in a manner of modifying the system message, when the quantity of the blocks of the idle V2V resources in the first resource pool is not less than the first preset threshold, or the quantity of the required resource blocks that is calculated by the base station according to the amount of the data to be sent by the first user equipment and the modulation and coding scheme is not greater than the quantity of the blocks of the idle V2V resources in the first resource pool, the base station still modifies the system message and sends the resource release indication paging message to all second user equipments in the cell, to instruct the second user equipments to receive the fourth indication message sent by the base station. If the base station sends an indication message to the first user equipment, when the first user equipment broadcasts a security-concerned message to the second user equipment, and adds, to the security-concerned message, the location information of the V2V resource that is allocated by the base station to the first user equipment from the second resource pool, the base station may directly send the fourth indication message to all second user equipments in the cell. In this case, the fourth indication message may be the resource release indication paging message.

In the V2V-based resource allocation method provided in this embodiment of the present invention, a base station receives a resource request message sent by first user equipment; identifies, according to the resource request message, a level type corresponding to the first user equipment; and if identifying that the level type corresponding to the first user equipment is a high priority type, and a quantity of blocks of idle V2V resources having a same size in a first resource pool is less than a first preset threshold, or a quantity of required resource blocks that is calculated by the base station according to an amount of data to be sent by the first user equipment and a modulation and coding scheme is greater than a quantity of blocks of idle V2V resources in a first resource pool, allocates a V2V resource to the first user equipment from V2V resources occupied by second user equipment in the first resource pool or from a second resource pool corresponding to another type other than the high priority type, where the V2V resource is used by the first user equipment to transmit V2V data, the first resource pool is a resource pool corresponding to the high priority type, and the second user equipment is user equipment of another type other than the high priority type. When the quantity of the blocks of the idle V2V resources having a same size in the first resource pool is less than the first preset threshold, or the quantity of the required resource blocks that is calculated by the base station according to the amount of the data to be sent by the first user equipment and the modulation and coding scheme is greater than the quantity of the blocks of the idle V2V resources in the first resource pool, the V2V resource is scheduled for the first user equipment from the V2V resource occupied by the second user equipment in the first resource pool or from the second resource pool, thereby resolving a technical problem that quality of service of user equipment of a high priority type cannot be ensured, and avoiding a case in the conventional art in which the user equipment of the high priority type cannot obtain a V2V resource when V2V resources are insufficient. Therefore, when the V2V resources are insufficient, the user equipment of the high priority type may preferentially obtain a V2V resource, thereby ensuring that a message of the user equipment of the high priority type can be sent in time, and better ensuring the quality of service of the high-priority user equipment. In addition, the base station may further allocate an idle V2V resource in the second resource pool to the first user equipment. When the quantity of the blocks of the idle V2V resources in the first resource pool is not less than the first preset threshold, or the quantity of the required resource blocks that is calculated by the base station according to the amount of the data to be sent by the first user equipment and the modulation and coding scheme is not greater than the quantity of the blocks of the idle V2V resources in the first resource pool, the base station schedules the first user equipment to release the V2V resource in the second resource pool, thereby improving utilization of the V2V resource in the second resource pool, and reducing as much as possible signaling overheads of releasing the occupied V2V resource.

Figure 4:
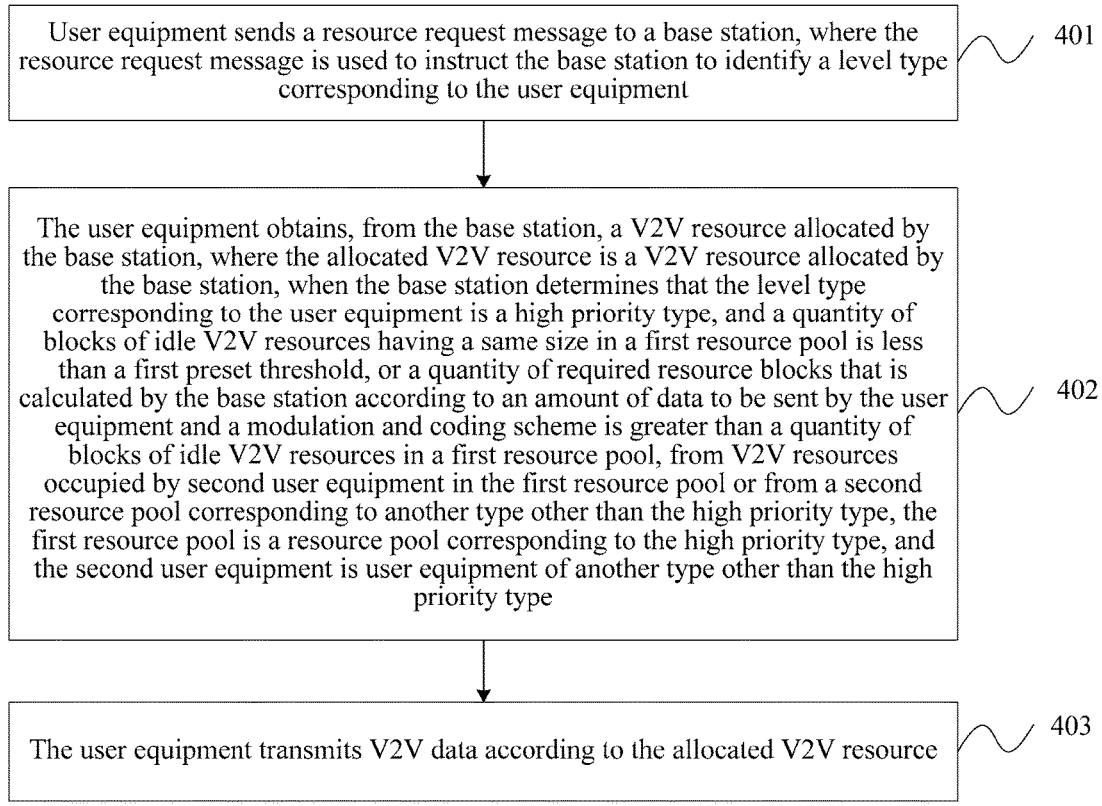
FIG. 4 is a schematic flowchart of a V2V-based resource allocation method according to yet another embodiment of the present invention.

FIG. 4 is a schematic flowchart of a V2V-based resource allocation method according to yet another embodiment of the present invention. This embodiment of the present invention provides the V2V-based resource allocation method. The method may be executed by any apparatus executing the V2V-based resource allocation method. The apparatus may be implemented by means of software and/or hardware. In this embodiment, the apparatus may be integrated into user equipment, for example, an in-vehicle communications unit in a vehicle. As shown in FIG. 4, the method in this embodiment may include the following steps.

Step 401: The user equipment sends a resource request message to a base station, where the resource request message is used to instruct the base station to identify a level type corresponding to the user equipment.

In this embodiment, the user equipment may be the first user equipment in the foregoing embodiments. Before sending the resource request to the base station, the user equipment first needs to send an RRC connection establishment request message, to establish a connection to the base station. After the base station and the user equipment successfully establish the connection, the base station may allocate identity information to the user equipment, where the identity information may be, for example, a cell radio network temporary identifier (Cell Radio Network Temporary Identifier, C-RNTI for short). After the base station allocates the identity information to the user equipment, the user equipment sends the resource request message to the base station according to the identity information, so that the base station identifies the level type corresponding to the user equipment. In a specific implementation process, the user equipment may add the user equipment identifier information used to identify a level type of user equipment to the RRC connection establishment request message, and send the RRC connection establishment request message to the base station, or after user equipment and the base station establish the connection, the user equipment may add the user equipment identifier information to other RRC signaling and report the RRC signaling to the base station, or the user equipment may add the user equipment identifier information to the resource request message and send the resource request message to the base station. When the user equipment adds the user equipment identifier information to the resource request message and sends the resource request message to the base station, the user equipment may perform reporting by using a subheader corresponding to a BSR. Specifically, the LCID is an identifier in the BSR reported by the user equipment. R in the LCID is a reserved bit, and the user equipment identifier information may be written into the R bit and reported to the base station. A manner of reporting, by the user equipment to the base station, the user equipment identifier information used to identify a level type of user equipment is not particularly limited in this embodiment.

Step 402: The user equipment obtains, from the base station, a V2V resource allocated by the base station, where the allocated V2V resource is a V2V resource allocated by the base station, when the base station determines that the level type corresponding to the user equipment is a high priority type, and a quantity of blocks of idle V2V resources having a same size in a first resource pool is less than a first preset threshold, or a quantity of required resource blocks that is calculated by the base station according to an amount of data to be sent by the user equipment and a modulation and coding scheme is greater than a quantity of blocks of idle V2V resources in a first resource pool, from V2V resources occupied by second user equipment in the first resource pool or from a second resource pool corresponding to another type other than the high priority type, the first resource pool is a resource pool corresponding to the high priority type, and the second user equipment is user equipment of another type other than the high priority type.

In this embodiment, the user equipment of the high priority type may be, for example, user equipment used in emergency circumstances, for example, a fire engine or an ambulance, or may be user equipment of another type other than the high priority type sending a high-priority security-concerned message to another user equipment. It should be noted that when the user equipment of another type other than the high priority type sends a high-priority security-concerned message, the user equipment not only needs to report user equipment identifier information used to identify a level type of user equipment to the base station, but also needs to report message identifier information used to identify a level type of a message to the base station. When the base station receives the message identifier information and identifies that the message is a high-priority message, the base station may temporarily consider the user equipment of another type other than the high priority type as user equipment of the high priority type.

In addition, the base station may classify V2V resources into a V2V resource in the first resource pool corresponding to the high priority type and a V2V resource in the second resource pool corresponding to another type other than the high priority type. The user equipment of the high priority type transmits V2V data by using a V2V resource in the first resource pool, that is, sends a security-concerned message to another user equipment, and the user equipment of another type other than the high priority type transmits V2V data by using a V2V resource in the second resource pool.

When the base station determines that the level type corresponding to the user equipment is the high priority type, the base station determines, by querying an idle resource table, whether the quantity of the blocks of the idle V2V resources having a same size in the first resource pool is less than the first preset threshold, or whether the quantity of the required resource blocks that is calculated by the base station according to the amount of the data to be sent by the user equipment and the modulation and coding scheme is greater than the quantity of the blocks of the idle V2V resources in the first resource pool; and if the quantity of the blocks of the idle V2V resources having a same size in the first resource pool is less than the first preset threshold, or the quantity of the required resource blocks is greater than the quantity of the blocks of the idle V2V resources in the first resource pool, selects an idle V2V resource from the V2V resources occupied by second user equipment of another type other than the high priority type in the first resource pool or from the second resource pool, and allocates the idle V2V resource to the user equipment. It should be noted that sizes of idle V2V resource blocks in the first resource pool may be the same or may be different.

Step 403: The user equipment transmits V2V data according to the allocated V2V resource.

In the V2V-based resource allocation method provided in this embodiment of the present invention, user equipment sends a resource request message to a base station, to instruct the base station to identify a level type corresponding to the user equipment; the user equipment obtains, from the base station, a V2V resource allocated by the base station, where the allocated V2V resource is a V2V resource allocated by the base station, when the base station determines that the level type corresponding to the user equipment is a high priority type, and a quantity of blocks of idle V2V resources having a same size in a first resource pool is less than a first preset threshold, or a quantity of required resource blocks that is calculated by the base station according to an amount of data to be sent by the user equipment and a modulation and coding scheme is greater than a quantity of blocks of idle V2V resources in a first resource pool, from V2V resources occupied by second user equipment in the first resource pool or from a second resource pool corresponding to another type other than the high priority type; and the user equipment transmits V2V data according to the allocated V2V resource. When the quantity of the blocks of the idle V2V resources having a same size in the first resource pool is less than the first preset threshold, or the quantity of the required resource blocks that is calculated by the base station according to the amount of the data to be sent by the user equipment and the modulation and coding scheme is greater than the quantity of the blocks of the idle V2V resources in the first resource pool, the V2V resource is scheduled for the user equipment from the V2V resource occupied by the second user equipment in the first resource pool or from the second resource pool, thereby resolving a technical problem that quality of service of user equipment of a high priority type cannot be ensured, and avoiding a case in the conventional art in which the user equipment of the high priority type cannot obtain a V2V resource when V2V resources are insufficient. Therefore, when the V2V resources are insufficient, the user equipment of the high priority type may preferentially obtain a V2V resource, thereby ensuring that a message of the user equipment of the high priority type can be sent in time, and better ensuring the quality of service of the high-priority user equipment.

Figure 5:
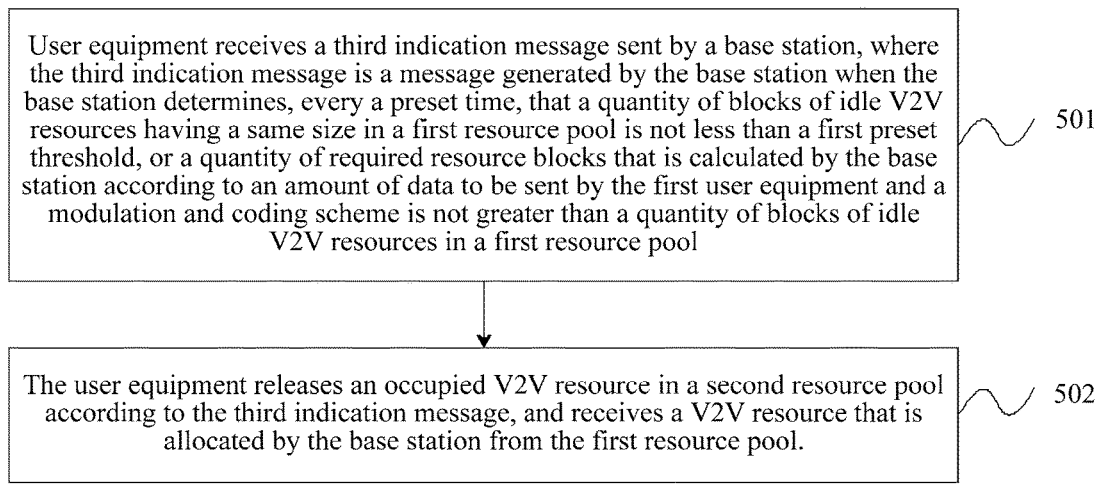
FIG. 5 is a schematic flowchart of a V2V-based resource allocation method according to yet another embodiment of the present invention.

FIG. 5 is a schematic flowchart of a V2V-based resource allocation method according to still another embodiment of the present invention. Based on the embodiment shown in FIG. 4, in this embodiment, an embodiment after the user equipment obtains, from the base station, the V2V resource allocated by the base station is described in detail. As shown in FIG. 5, the method in this embodiment may include the following steps.

Step 501: The user equipment receives a third indication message sent by the base station, where the third indication message is a message generated by the base station when the base station determines, every a preset time, that the quantity of the blocks of the idle V2V resources having a same size in the first resource pool is not less than the first preset threshold, or the quantity of the required resource blocks that is calculated by the base station according to the amount of the data to be sent by the first user equipment and the modulation and coding scheme is not greater than the quantity of the blocks of the idle V2V resources in the first resource pool.

In this embodiment, the user equipment sends the resource request message to the base station, to request the base station to allocate the V2V resource. After receiving the resource request message, the base station queries the idle resource table. If the base station knows by means of querying that the quantity of the blocks of the idle V2V resources having a same size in the first resource pool is less than the first preset threshold, or the quantity of the required resource blocks that is calculated by the base station according to the amount of the data to be sent by the first user equipment and the modulation and coding scheme is greater than the quantity of the blocks of the idle V2V resources in the first resource pool, and a quantity of blocks of idle V2V resources in the second resource pool is not less than a second preset threshold, or the quantity of the required resource blocks that is calculated by the base station according to the amount of the data to be sent by the first user equipment and the modulation and coding scheme is not greater than the quantity of the blocks of the idle V2V resources in the second resource pool, the base station may select a V2V resource from the second resource pool and allocate the V2V resource to the first user equipment. After allocating the V2V resource to the user equipment from the second resource pool, the base station may query the idle resource table periodically every a preset time, to determine whether the quantity of the idle V2V resources in the first resource pool is not less than the first preset threshold, or whether the quantity of the required resource blocks that is calculated by the base station according to the amount of the data to be sent by the first user equipment and the modulation and coding scheme is not greater than the quantity of the blocks of the idle V2V resources in the first resource pool, and if the quantity of the idle V2V resources in the first resource pool is not less than the first preset threshold, or the quantity of the required resource blocks is not greater than the quantity of the blocks of the idle V2V resources in the first resource pool, the base station sends the third indication message to the user equipment. In a specific implementation process, the base station may determine, by querying the quantity of the blocks of the idle V2V resources having a same size in the first resource pool, whether to send the third indication message to the user equipment, or may determine, by querying a difference between the quantity of the blocks of the idle V2V resources and a quantity of user equipments occupying V2V resources in the second resource pool and determining whether the difference is greater than a preset value, whether to send the third indication message to the user equipment. If the difference is greater than the preset value, it indicates that the idle V2V resources in the first resource pool are sufficient for all user equipments occupying the V2V resources in the second resource pool. In this case, the base station sends the third indication message to the user equipment, and allocates the V2V resource to the user equipment from the first resource pool. For example, it is assumed that three user equipments occupy V2V resources in the second resource pool currently, and the base station obtains through querying that there are five idle V2V resources in the first resource pool. Therefore, a difference between the quantity of the idle V2V resources in the first resource pool and the quantity of the user equipments occupying the V2V resources in the second resource pool is 2, and the difference is greater than the preset value 1. It indicates that the V2V resources in the first resource pool are sufficient for all user equipments occupying the V2V resources in the second resource pool. Therefore, the base station sends the third indication message to the user equipment.

Step 502: The user equipment releases the occupied V2V resource in the second resource pool according to the third indication message, and receives the V2V resource that is allocated by the base station from the first resource pool.

In this embodiment, after receiving the third indication message sent by the base station, the user equipment releases the occupied V2V resource in the second resource pool according to the third indication message, and receives the V2V resource that is allocated by the base station from the first resource pool.

In the V2V-based resource allocation method provided in this embodiment of the present invention, user equipment sends a resource request message to a base station, to instruct the base station to identify a level type corresponding to the user equipment; the user equipment obtains, from the base station, a V2V resource allocated by the base station, where the allocated V2V resource is a V2V resource allocated by the base station, when the base station determines that the level type corresponding to the user equipment is a high priority type, and a quantity of blocks of idle V2V resources having a same size in a first resource pool is less than a first preset threshold, or a quantity of required resource blocks that is calculated by the base station according to an amount of data to be sent by the user equipment and a modulation and coding scheme is greater than a quantity of blocks of idle V2V resources in a first resource pool, from V2V resources occupied by second user equipment in the first resource pool or from a second resource pool corresponding to another type other than the high priority type; and the user equipment transmits V2V data according to the allocated V2V resource. When the quantity of the blocks of the idle V2V resources having a same size in the first resource pool is less than the first preset threshold, or the quantity of the required resource blocks that is calculated by the base station according to the amount of the data to be sent by the user equipment and the modulation and coding scheme is greater than the quantity of the blocks of the idle V2V resources in the first resource pool, the V2V resource is scheduled for the user equipment from the V2V resource occupied by the second user equipment in the first resource pool or from the second resource pool, thereby resolving a technical problem that quality of service of user equipment of a high priority type cannot be ensured, and avoiding a case in the conventional art in which the user equipment of the high priority type cannot obtain a V2V resource when V2V resources are insufficient. Therefore, when the V2V resources are insufficient, the user equipment of the high priority type may preferentially obtain a V2V resource, thereby ensuring that a message of the user equipment of the high priority type can be sent in time, and better ensuring the quality of service of the high-priority user equipment. In addition, the base station may further allocate an idle V2V resource in the second resource pool to the user equipment. When the quantity of the blocks of the idle V2V resources in the first resource pool is not less than the first preset threshold, or the quantity of the required resource blocks that is calculated by the base station according to the amount of the data to be sent by the user equipment and the modulation and coding scheme is not greater than the quantity of the blocks of the idle V2V resources in the first resource pool, the base station schedules the user equipment to release the V2V resource in the second resource pool, so that utilization of the V2V resource in the second resource pool is improved, and allocation of the V2V resource is more flexible.

It should be noted that the user equipment may send a second release message to the base station after receiving the third indication message sent by the base station and releases the occupied V2V resource according to the third indication message, to notify the base station of a resource release status. After receiving the second release message, the base station determines, according to the resource release status carried in the second release message, whether the user equipment successfully releases the resource; if the resource is successfully released, the base station allocates the idle V2V resource obtained through querying in the first resource pool to the user equipment, to ensure reliability of obtaining, by the user equipment, a V2V resource.

Figure 6:
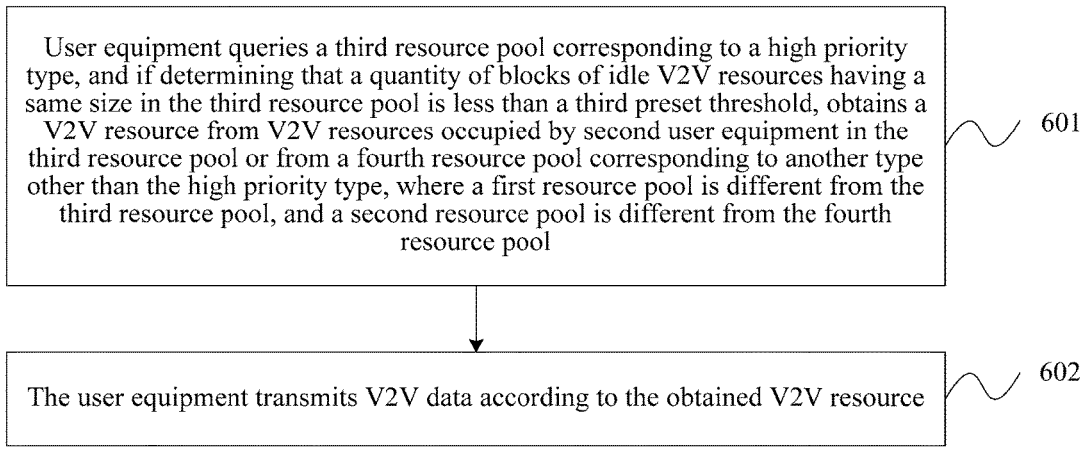
FIG. 6 is a schematic flowchart of a V2V-based resource allocation method according to yet another embodiment of the present invention.

FIG. 6 is a schematic flowchart of a V2V-based resource allocation method according to yet another embodiment of the present invention. As shown in FIG. 6, the method in this embodiment may include the following steps.

Step 601: User equipment queries a third resource pool corresponding to a high priority type, and if determining that a quantity of blocks of idle V2V resources having a same size in the third resource pool is less than a third preset threshold, obtains a V2V resource from V2V resources occupied by second user equipment in the third resource pool or from a fourth resource pool corresponding to another type other than the high priority type, where a first resource pool is different from the third resource pool, and a second resource pool is different from the fourth resource pool.

In this embodiment, without coverage of the base station, user equipment of a high priority type obtains, in a manner of contention, a V2V resource from the third resource pool corresponding to the high priority type, and user equipment of another type other than the high priority type obtains, in a manner of contention, a V2V resource from the fourth resource pool corresponding to another type other than the high priority type. A difference between the third resource pool and the first resource pool lies in that the first resource pool is specified by the base station, and similarly, a difference between the fourth resource pool and the second resource pool lies in that the second resource pool is specified by the base station. Specifically, the user equipment queries the quantity of the blocks of the idle V2V resources in the third resource pool corresponding to the high priority type, to determine whether the quantity of the blocks of the idle V2V resources is less than the third preset threshold. In a specific implementation process, the user equipment may directly determine whether the quantity of the blocks of the idle V2V resources is less than the third preset threshold, or may determine whether a ratio of the quantity of the blocks of the idle V2V resources to a quantity of blocks of all V2V resources in the third resource pool is less than a preset value, and when knowing that the quantity of the blocks of the idle V2V resources in the third resource pool is less than the third preset threshold or the ratio of the quantity of the blocks of the idle V2V resources to the quantity of the blocks of all V2V resources in the third resource pool is less than the preset value, that is, the user equipment cannot obtain the V2V resource from the third resource pool in a manner of contention, the user equipment may obtain the V2V resource from the V2V resources occupied by the second user equipment in the third resource pool or from the fourth resource pool. In a specific implementation process, the third preset threshold and the preset value are set according to actual statuses, and this is not particularly limited in the present invention.

Step 602: The user equipment transmits V2V data according to the obtained V2V resource.

In the V2V-based resource allocation method provided in this embodiment of the present invention, user equipment queries a third resource pool corresponding to a high priority type, and if determining that a quantity of blocks of idle V2V resources having a same size in the third resource pool is less than a third preset threshold, obtains a V2V resource from V2V resources occupied by second user equipment in the third resource pool or from a fourth resource pool corresponding to another type other than the high priority type, thereby resolving a technical problem that quality of service of user equipment of a high priority type cannot be ensured, and avoiding a case in the conventional art in which the user equipment of the high priority type cannot obtain a V2V resource when V2V resources are insufficient. Therefore, when the V2V resources are insufficient, the user equipment of the high priority type may preferentially obtain a V2V resource, thereby ensuring that a message of the user equipment of the high priority type can be sent in time, and better ensuring the quality of service of the high-priority user equipment.

Optionally, if the user equipment determines that the quantity of the idle V2V resources in the third resource pool is not less than the third preset threshold, the user equipment obtains the V2V resource from the third resource pool.

Figure 7:
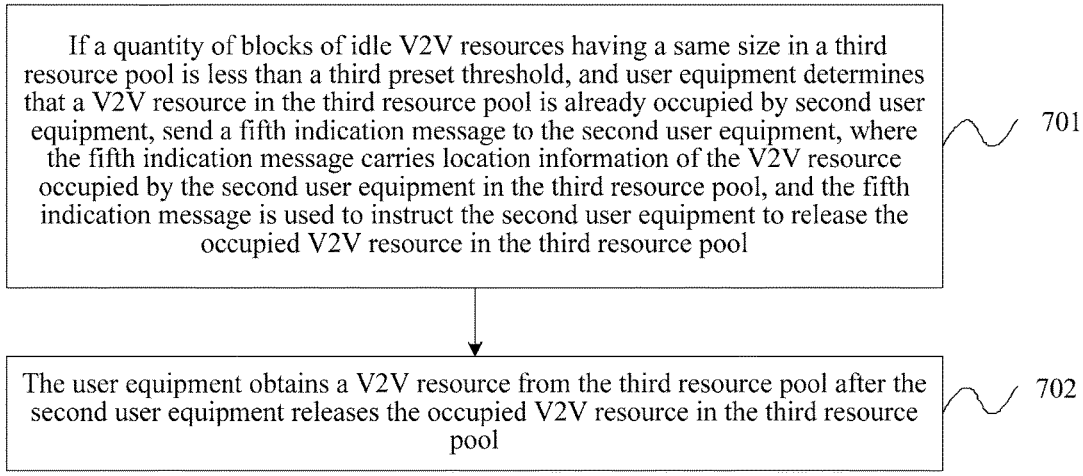
FIG. 7 is a schematic flowchart of a V2V-based resource allocation method according to yet another embodiment of the present invention.

FIG. 7 is a schematic flowchart of a V2V-based resource allocation method according to yet another embodiment of the present invention. Based on the embodiment shown in FIG. 6, in this embodiment, an embodiment of obtaining, by the user equipment, the V2V resource from the V2V resources occupied by the second user equipment in the third resource pool is described in detail. As shown in FIG. 7, the method in this embodiment may include the following steps.

Step 701: If the quantity of the blocks of the idle V2V resources having a same size in the third resource pool is less than the third preset threshold, and the user equipment determines that a V2V resource in the third resource pool is already occupied by the second user equipment, send a fifth indication message to the second user equipment, where the fifth indication message carries location information of the V2V resource occupied by the second user equipment in the third resource pool, and the fifth indication message is used to instruct the second user equipment to release the occupied V2V resource in the third resource pool.

In this embodiment, when the second user equipment queries the fourth resource pool and knows that a quantity of blocks of idle V2V resources in the fourth resource pool is less than a fourth preset threshold, the second user equipment may query the quantity of the blocks of the idle V2V resources in the third resource pool, and when the quantity of the blocks of the idle V2V resources having a same size in the third resource pool is not less than the third preset threshold, the second user equipment may contend for the V2V resource in the third resource pool.

In this case, when user equipment arrives and is to contend for a V2V resource in the third resource pool, the user equipment queries the quantity of the blocks of the idle V2V resources in the third resource pool, to determine whether the quantity of the blocks of the idle V2V resources having a same size in the third resource pool is less than the third preset threshold. In a specific implementation manner, the user equipment may directly determine whether the quantity of the blocks of the idle V2V resources having a same size is less than the first preset threshold, or may determine whether the ratio of the quantity of the blocks of the idle V2V resources having a same size to the quantity of the blocks of all V2V resources in the third resource pool is less than the preset value. When knowing that the quantity of the blocks of the idle V2V resources is greater than or equal to the third preset threshold, the user equipment contends for the V2V resource in the third resource pool, and when knowing that the quantity of the idle V2V resources is less than the third preset threshold and there is second user equipment occupying a V2V resource in the third resource pool, the user equipment sends a fifth indication message to at least one second user equipment occupying the V2V resource in the third resource pool. After receiving the fifth indication message, the second user equipment releases the occupied V2V resource in the third resource pool, and re-contends for a V2V resource in the fourth resource pool. The third preset threshold and the fourth preset threshold may be set according to actual application, and specific values of the third preset threshold and the fourth preset threshold are not particularly limited in the present invention. For example, assuming that there are 10 V2V resources in the third resource pool, when the quantity of the blocks of the idle V2V resources in the third resource pool is greater than or equal to 3, the second user equipment may occupy a V2V resource in the third resource pool. When the user equipment knows through querying that the quantity of the blocks of the idle V2V resources in the third resource pool is less than 3, if there is second user equipment occupying the V2V resource in the third resource pool, the second user equipment needs to release the occupied V2V resource. When the second user equipment cannot obtain through contention the V2V resource in the fourth resource pool, and finds through listening that the quantity of the idle V2V resources in the third resource pool is 4, the second user equipment may occupy one V2V resource in the third resource pool, and transmit V2V data. In this case, when user equipment arrives and needs to contend for a resource in the third resource pool, after the user equipment listens to the quantity of the blocks of the idle V2V resources, the user equipment knows that the quantity of the blocks of the idle V2V resources is 3, and after occupying one V2V resource, the user equipment finds that the quantity of the blocks of the idle V2V resources in the third resource pool is 2, less than the third preset threshold, and determines that there is second user equipment occupying the V2V resource in the third resource pool. Therefore, when broadcasting a security-concerned message to another user equipment, the user equipment instructs at least one second user equipment occupying the V2V resource in the third resource pool to release the V2V resource.

Step 702: The user equipment obtains a V2V resource from the third resource pool after the second user equipment releases the occupied V2V resource in the third resource pool.

In this embodiment, after the second user equipment releases the occupied V2V resource in the third resource pool, the user equipment obtains the V2V resource from the third resource pool after the second user equipment releases the occupied V2V resource, to transmit V2V data.

In the V2V-based resource allocation method provided in this embodiment of the present invention, when a quantity of blocks of V2V resources in a third resource pool is less than a third preset threshold, if there is second user equipment occupying a V2V resource in the third resource pool, a V2V resource is obtained from the V2V resource occupied by the second user equipment in the third resource pool, thereby resolving a technical problem that quality of service of user equipment of a high priority type cannot ensured, and avoiding a case in the conventional art in which the user equipment of the high priority type cannot obtain a V2V resource when V2V resources are insufficient. Therefore, when the V2V resources are insufficient, the user equipment of the high priority type preferentially obtains the V2V resource, thereby ensuring that a message of the user equipment of the high priority type can be sent in time, and better ensuring the quality of service of the user equipment of the high priority type. In addition, resource allocation is more flexible.

Optionally, after the second user equipment releases the occupied V2V resource in the third resource pool, the second user equipment may further send a first release message to the user equipment. The user equipment determines, according to a resource release status carried in the first release message, whether the second user equipment successfully releases the V2V resource. If the resource is released successfully, the user equipment obtains the V2V resource from the third resource pool after the second user equipment releases the V2V resource, thereby ensuring reliability of obtaining, by the user equipment, the V2V resource.

Figure 8:
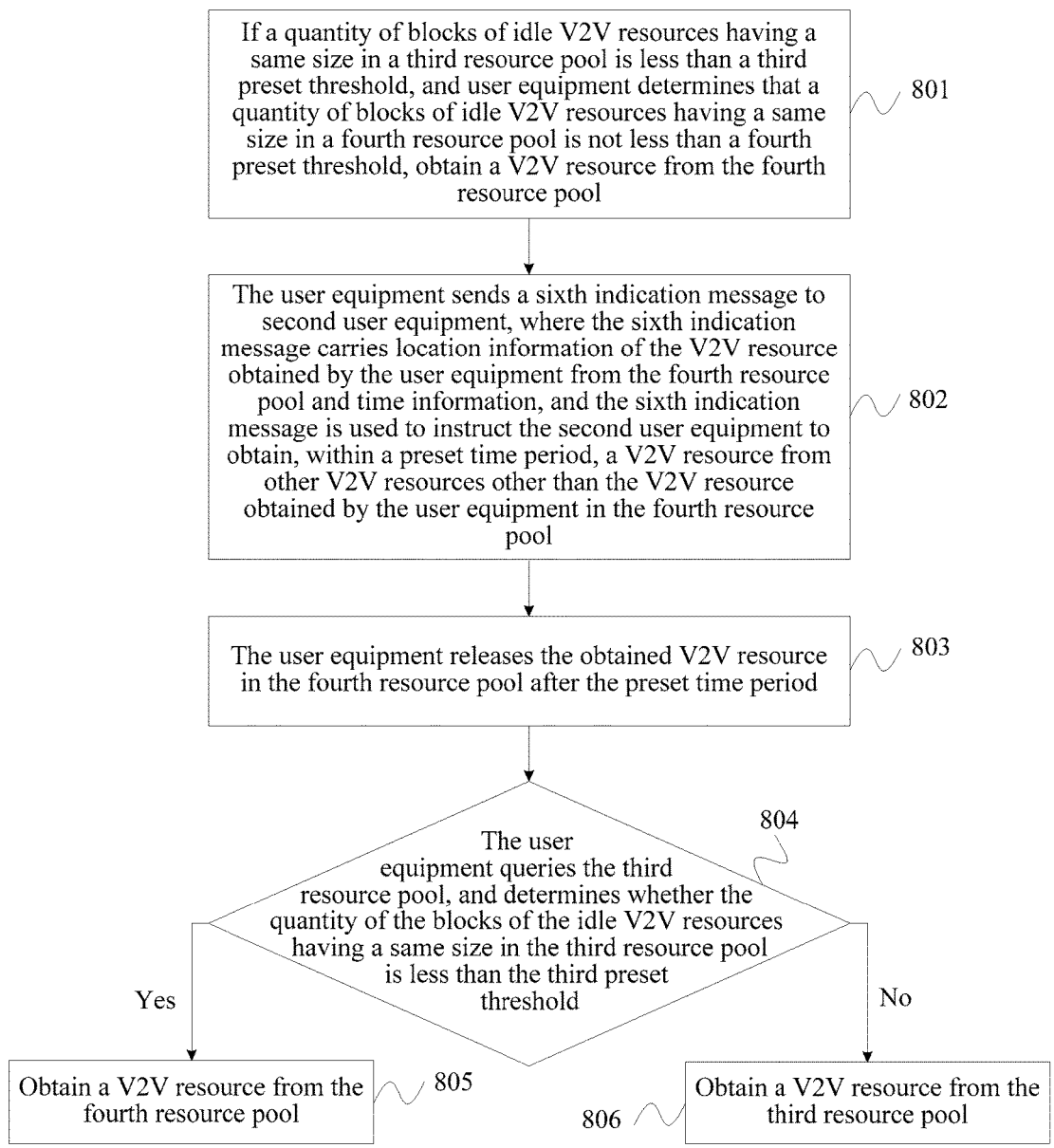
FIG. 8 is a schematic flowchart of a V2V-based resource allocation method according to yet another embodiment of the present invention.

FIG. 8 is a schematic flowchart of a V2V-based resource allocation method according to yet another embodiment of the present invention. Based on the embodiment shown in FIG. 6, in this embodiment, an embodiment of obtaining, by the user equipment, the V2V resource from the fourth resource pool is described in detail. As shown in FIG. 8, the method in this embodiment may include the following steps.

Step 801: If the quantity of the blocks of the idle V2V resources having a same size in the third resource pool is less than the third preset threshold, and the user equipment determines that a quantity of blocks of idle V2V resources having a same size in the fourth resource pool is not less than a fourth preset threshold, obtain a V2V resource from the fourth resource pool.

In this embodiment, after the user equipment obtains through querying the quantity of the blocks of the idle V2V resources having a same size in the third resource pool, if the user equipment knows that the quantity of the blocks of the idle V2V resources is less than the third preset threshold, and the quantity of the blocks of the idle V2V resources in the fourth resource pool is not less than the fourth preset threshold, the user equipment may obtain the V2V resource from the fourth resource pool in a manner of contention. The third preset threshold and the fourth preset threshold may be set according to actual application, and specific values of the third preset threshold and the fourth preset threshold are not particularly limited in the present invention. For example, if the third preset threshold is set to 3 and the fourth preset threshold is set to 2, it is assumed that there are 10 V2V resources in the third resource pool and no V2V resource in the third resource pool is occupied by the second user equipment. In this case, when new user equipment of a high priority type arrives, if it is obtained through listening that the quantity of the idle V2V resources in the third resource pool is 1, less than the third preset threshold 3, the user equipment considers that the V2V resource in the third resource pool is insufficient, and there is a risk that the new user equipment cannot obtain a V2V resource. If the user equipment finds through listening that the quantity of the idle V2V resources in the fourth resource pool is 4, greater than the fourth preset threshold 2, the user equipment obtains the V2V resource from the fourth resource pool, and transmits V2V data, to send a security-concerned message to another user equipment.

Step 802: The user equipment sends a sixth indication message to the second user equipment, where the sixth indication message carries location information of the V2V resource obtained by the user equipment from the fourth resource pool and time information, and the sixth indication message is used to instruct the second user equipment to obtain, within a preset time period, the V2V resource from other V2V resources other than the V2V resource obtained by the user equipment in the fourth resource pool.

In this embodiment, when the quantity of the blocks of the idle V2V resources having a same size in the third resource pool is less than the third preset threshold, and after the user equipment obtains the V2V resource from the fourth resource pool, the user equipment sends the sixth indication message to the second user equipment, to notify the second user equipment that the second user equipment cannot contend for, within the preset time period, the V2V resource occupied by the user equipment in the fourth resource pool. That is, the second user equipment can contend for, within the preset time period, a required V2V resource only from other V2V resources other than the V2V resource obtained by the user equipment in the fourth resource pool.

Step 803: The user equipment releases the obtained V2V resource in the fourth resource pool after the preset time period.

In this embodiment, after the user equipment obtains the V2V resource from the fourth resource pool, the user equipment transmits V2V data according to the V2V resource within the preset time period, and the user equipment releases the occupied V2V resource in the fourth resource pool after the preset time period, so that the second user equipment can contend for the V2V resource in the fourth resource pool after the user equipment releases the occupied V2V resource in the fourth resource pool.

Optionally, after the user equipment releases the occupied V2V resource in the fourth resource pool after the preset time period, the user equipment may further send a second release message to the second user equipment. The second user equipment determines, according to a resource release status carried in the received second release message, whether the user equipment successfully releases the resource, and if the user equipment successfully releases the resource, the second user equipment may use the V2V resource previously occupied by the user equipment. That is, the second user equipment may obtain the V2V resource from the fourth resource pool after the user equipment releases the occupied V2V resource in the fourth resource pool.

Step 804: The user equipment queries the third resource pool, and determines whether the quantity of the blocks of the idle V2V resources having a same size in the third resource pool is less than the third preset threshold; if the quantity of the blocks of the idle V2V resources having a same size in the third resource pool is less than the third preset threshold, perform step 805; if the quantity of the blocks of the idle V2V resources having a same size in the third resource pool is not less than the third preset threshold, perform step 806.

Step 805: Obtain the V2V resource from the fourth resource pool.

In this embodiment, after the user equipment releases the occupied V2V resource in the fourth resource pool after the preset time period, if the user equipment knows through querying that the quantity of the blocks of the idle V2V resources in the third resource pool is still less than the third preset threshold, the user equipment continues to contend for the V2V resource from the fourth resource pool.

Step 806: Obtain the V2V resource from the third resource pool.

In this embodiment, if the user equipment knows through querying that the quantity of the blocks of the idle V2V resources in the third resource pool is not less than the third preset threshold, the user equipment no longer occupies the V2V resource in the fourth resource pool, but obtains the V2V resource from the third resource pool.

In the V2V-based resource allocation method provided in this embodiment of the present invention, when a quantity of blocks of idle V2V resources in a third resource pool is less than a third preset threshold, and a quantity of blocks of idle V2V resources in a fourth resource pool is not less than a fourth preset threshold, user equipment may obtain a V2V resource from the fourth resource pool, thereby resolving a technical problem that quality of service of user equipment of a high priority type cannot ensured, and avoiding a case in the conventional art in which the user equipment of the high priority type cannot obtain a V2V resource when V2V resources are insufficient. Therefore, when the V2V resources are insufficient, the user equipment of the high priority type preferentially obtains the V2V resource, thereby ensuring that a message of the user equipment of the high priority type can be sent in time, and better ensuring the quality of service of the user equipment of the high priority type. In addition, resource allocation is more flexible.

Figure 9:
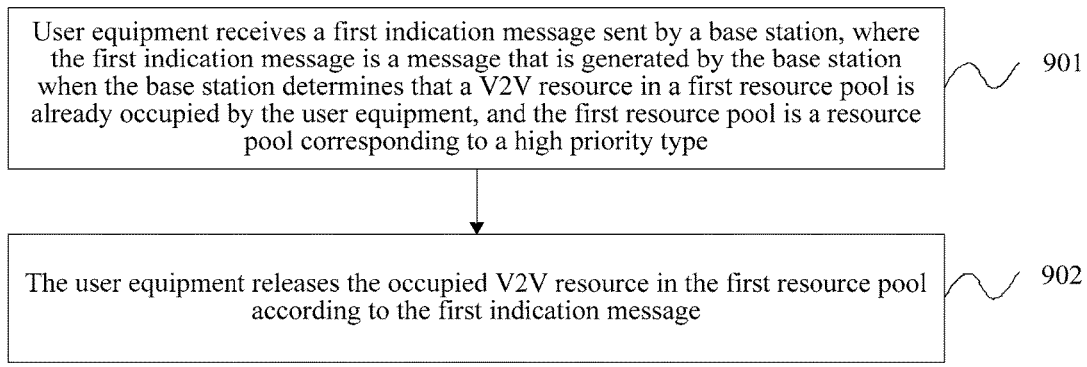
FIG. 9 is a schematic flowchart of a V2V-based resource allocation method according to yet another embodiment of the present invention.

FIG. 9 is a schematic flowchart of a V2V-based resource allocation method according to yet another embodiment of the present invention. This embodiment of the present invention provides the V2V-based resource allocation method. The method may be executed by any apparatus executing the V2V-based resource allocation method. The apparatus may be implemented by means of software and/or hardware. In this embodiment, the apparatus may be integrated into user equipment, for example, an in-vehicle communications unit in a vehicle. As shown in FIG. 9, the method in this embodiment may include the following steps.

Step 901: The user equipment receives a first indication message sent by a base station, where the first indication message is a message that is generated by the base station when the base station determines that a V2V resource in a first resource pool is already occupied by the user equipment, and the first resource pool is a resource pool corresponding to a high priority type.

In this embodiment, the user equipment may be the second user equipment in the foregoing embodiments. That is, user equipment of another type other than the high priority type. For example, the user equipment of the high priority type may be user equipment used in emergency circumstances, for example, a fire engine or an ambulance, or may be user equipment of another type other than the high priority type sending a high-priority security-concerned message to another user equipment. It should be noted that when the user equipment of another type other than the high priority type sends a high-priority security-concerned message, the user equipment not only needs to report user equipment identifier information used to identify a level type of user equipment to the base station, but also needs to report message identifier information used to identify a level type of a message to the base station. When the base station receives the message identifier information and identifies that the message is a high-priority message, the base station may temporarily consider the user equipment of another type other than the high priority type as user equipment of the high priority type.

In addition, under coverage of the base station, the base station may classify V2V resources into a V2V resource in the first resource pool corresponding to the high priority type and a V2V resource in a second resource pool corresponding to another type other than the high priority type. The user equipment of the high priority type transmits V2V data by using a V2V resource in the first resource pool, that is, sends a security-concerned message to another user equipment, and the user equipment of another type other than the high priority type transmits V2V data by using a V2V resource in the second resource pool. When a quantity of blocks of idle V2V resources having a same size in the second resource pool is less than a second preset threshold, the user equipment requests the base station to allocate a V2V resource in the first resource pool. Specifically, the user equipment sends a resource request message to the base station, and after receiving the resource request message, the base station identifies the level type of the user equipment according to the resource request message. If knowing that the user equipment is the user equipment of another type other than the high priority type, the base station determines, by querying an idle resource table, whether a quantity of blocks of idle V2V resources having a same size in the first resource pool is less than a first preset threshold, or determines, by querying an idle resource table, whether a quantity of required resource blocks that is calculated according to an amount of data to be sent by first user equipment and a modulation and coding scheme is greater than a quantity of blocks of idle V2V resources in the first resource pool. If the quantity of the blocks of the idle V2V resources having a same size in the first resource pool is less than the first preset threshold, or the calculated quantity of the required resource blocks is greater than the quantity of the blocks of the idle V2V resources in the first resource pool, the base station sends a resource allocation refusal message to the user equipment. After receiving the resource allocation refusal message, the user equipment re-attempts to contend for a V2V resource in the second resource pool, and within a preset time period afterwards, the user equipment cannot send a resource request message to the base station, to avoid that when V2V resources in the second resource pool are insufficient, because the user equipment frequently sends the resource request message to the base station, resource wastes are caused. The preset time period may be set according to actual statuses, and this is not particularly limited in this embodiment. If the base station knows by means of querying that the quantity of the blocks of the idle V2V resources having a same size in the first resource pool is not less than the first preset threshold, or the calculated quantity of the required resource blocks is less than the quantity of the blocks of the idle V2V resources in the first resource pool, the base station selects a V2V resource from the idle V2V resource, allocates the V2V resource to the user equipment, records identity information of the user equipment, user equipment identifier information, and location information of the allocated V2V resource in the first resource pool, and deletes a related record of the V2V resource in the idle resource table. The first preset threshold and the second preset threshold may be set according to actual application, and specific values of the first preset threshold and the second preset threshold are not particularly limited in the present invention.

In this case, if there is first user equipment sending the resource request message to the base station, and the base station identifies that a level type corresponding to the first user equipment is the high priority type, the base station queries the idle resource table, to determine whether the quantity of the blocks of the idle V2V resources having a same size in the first resource pool is not less than the first preset threshold, or determine whether a quantity of required resource blocks that is calculated according to an amount of data to be sent by the first user equipment and a modulation and coding scheme is not greater than the quantity of the blocks of the idle V2V resources in the first resource pool; if the quantity of the blocks of the idle V2V resources having a same size in the first resource pool is not less than the first preset threshold, or the quantity of the required resource blocks is not greater than the quantity of the blocks of the idle V2V resources in the first resource pool, the base station selects a V2V resource from the first resource pool and allocates the V2V resource to the first user equipment; if the quantity of the blocks of the idle V2V resources having a same size in the first resource pool is less than the first preset threshold, or the quantity of the required resource blocks is greater than the quantity of the blocks of the idle V2V resources in the first resource pool, the base station queries a resource allocation table, to determine whether there is user equipment occupying a V2V resource in the first resource pool, and when the base station determines that there is the user equipment occupying the V2V resource in the first resource pool, the base station sends a first indication message to at least one user equipment occupying the V2V resource in the first resource pool.

Step 902: The user equipment releases the occupied V2V resource in the first resource pool according to the first indication message.

In this embodiment, after receiving the first indication message sent by the base station, the user equipment releases the occupied V2V resource in the first resource pool according to the first indication message. The base station selects a V2V resource from the V2V resource released by the user equipment, and allocates the V2V resource to the first user equipment. The first user equipment transmits V2V data according to the allocated V2V resource, to broadcast a security-concerned message to another user equipment.

In the V2V-based resource allocation method provided in this embodiment of the present invention, user equipment receives a first indication message sent by a base station, where the first indication message is a message generated by the base station when the base station determines that a V2V resource in a first resource pool is already occupied by the user equipment, and the user equipment releases the occupied V2V resource in the first resource pool according to the first indication message. Because when V2V resources in a second resource pool are insufficient, the user equipment may occupy the V2V resource in the first resource pool, if first user equipment requests the base station to allocate a resource, the base station schedules the user equipment to release the occupied V2V resource in the first resource pool, thereby resolving a technical problem that quality of service of user equipment of a high priority type cannot be ensured, and avoiding a case in the conventional art in which the user equipment of the high priority type cannot obtain a V2V resource when V2V resources are insufficient. Therefore, when the V2V resources in the first resource pool are insufficient, a V2V resource is preferentially scheduled for the user equipment of the high priority type, thereby ensuring that a message of the user equipment of the high priority type can be sent in time, and better ensuring the quality of service of the user equipment of the high priority type.

In addition, after releasing the occupied V2V resource in the first resource pool according to the received first indication message, the user equipment may further send a first release message carrying a resource release status to the base station. When the base station determines that the release status in the first release message is that the resource is released successfully, the base station selects a V2V resource from the V2V resource released by the user equipment, and allocates the selected V2V resource to the first user equipment.

Optionally, the user equipment receives a second indication message sent by the base station. The second indication message is a message generated by the base station when the base station determines that a quantity of blocks of idle V2V resources having a same size in the second resource pool is not less than a second preset threshold, or the quantity of the required resource blocks that is calculated by the base station according to the amount of the data to be sent by the first user equipment and the modulation and coding scheme is not greater than a quantity of blocks of idle V2V resources in the second resource pool, the second indication message carries location information of a V2V resource allocated by the base station to the first user equipment in the second resource pool. The user equipment obtains, according to the location information of the V2V resource in the second indication message, the V2V resource from other V2V resources other than the V2V resource occupied by the first user equipment in the second resource pool.

Specifically, if the base station queries the idle resource table and knows that the quantity of the blocks of the idle V2V resources having a same size in the first resource pool is less than the first preset threshold, or the quantity of the required resource blocks that is calculated by the base station according to the amount of the data to be sent by the first user equipment and the modulation and coding scheme is greater than the quantity of the blocks of the idle V2V resources in the first resource pool, and the quantity of the blocks of the idle V2V resources having a same size in the second resource pool is not less than the second preset threshold, or the quantity of the required resource blocks that is calculated by the base station according to the amount of the data to be sent by the first user equipment and the modulation and coding scheme is not greater than the quantity of the blocks of the idle V2V resources in the second resource pool, the base station selects an idle V2V resource from the second resource pool, allocates the idle V2V resource to the first user equipment, and sends the second indication message to the user equipment, to notify the user equipment not to use the V2V resource allocated to the first user equipment, and obtain a V2V resource from other V2V resources other than the V2V resource occupied by the first user equipment in the second resource pool, to transmit V2V data.

Optionally, the user equipment receives a fourth indication message sent by the base station. The fourth indication message is a message generated by the base station when the base station determines that the quantity of the blocks of the idle V2V resources having a same size in the first resource pool is not less than the first preset threshold, or the quantity of the required resource blocks that is calculated by the base station according to the amount of the data to be sent by the first user equipment and the modulation and coding scheme is not greater than the quantity of the blocks of the idle V2V resources in the first resource pool, and the fourth indication message carries the location information of the V2V resource released by the first user equipment. The user equipment obtains, according to the location information of the V2V resource in the fourth indication message, the V2V resource from the second resource pool after the first user equipment releases the occupied V2V resource in the second resource pool.

Specifically, when the quantity of the blocks of the idle V2V resources having a same size in the first resource pool is less than the first preset threshold, or the quantity of the required resource blocks that is calculated by the base station according to the amount of the data to be sent by the first user equipment and the modulation and coding scheme is greater than the quantity of the blocks of the idle V2V resource in the first resource pool, and the quantity of the blocks of the idle V2V resources having a same size in the second resource pool is not less than the second preset threshold, or the quantity of the required resource blocks that is calculated by the base station according to the amount of the data to be sent by the first user equipment and the modulation and coding scheme is not greater than the quantity of the blocks of the idle V2V resources in the second resource pool, the base station may allocate the V2V resource to the first user equipment from the second resource pool, and query the first resource pool periodically, to determine whether the quantity of the blocks of the idle V2V resources in the first resource pool is not less than the first preset threshold, or determine whether the quantity of the required resource blocks that is calculated according to the amount of the data to be sent by the first user equipment and the modulation and coding scheme is not greater than the quantity of the blocks of the idle V2V resources in the first resource pool; if the quantity of the blocks of the idle V2V resources in the first resource pool is not less than the first preset threshold, or the quantity of the required resource blocks is not greater than the quantity of the blocks of the idle V2V resources in the first resource pool, the base station sends the third indication message to the first user equipment, and allocates the V2V resource to the first user equipment from the first resource pool. After receiving the third indication message, the first user equipment releases the occupied V2V resource in the second resource pool according to the third indication message. In addition, after the base station determines that the quantity of the blocks of the idle V2V resources in the first resource pool is not less than the first preset threshold, the base station sends the fourth indication message to the user equipment, to notify the user equipment that the user equipment can contend for the V2V resource released by the first user equipment. That is, the user equipment may obtain the V2V resource from the second resource pool after the first user equipment releases the occupied V2V resource in the second resource pool, and transmit V2V data according to the obtained V2V resource, to broadcast a security-concerned message to another user equipment.

Figure 10:
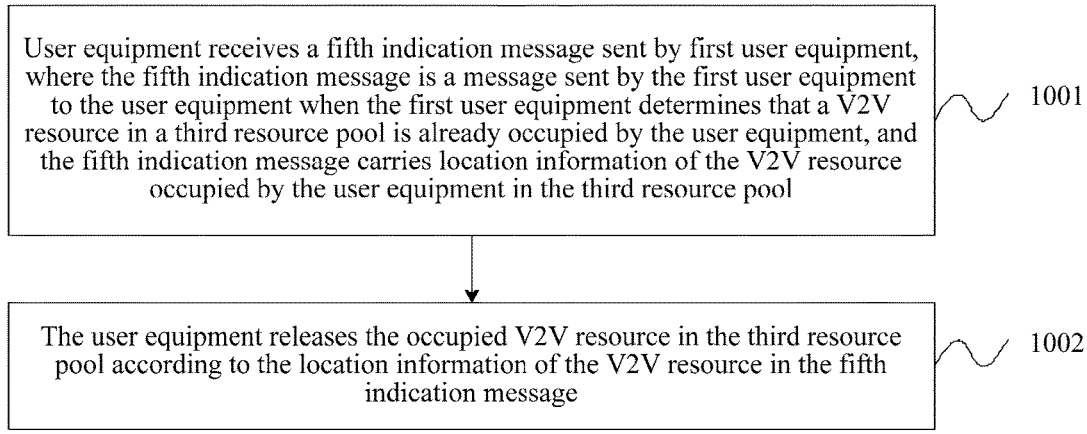
FIG. 10 is a schematic flowchart of a V2V-based resource allocation method according to yet another embodiment of the present invention.

FIG. 10 is a schematic flowchart of a V2V-based resource allocation method according to still another embodiment of the present invention. As shown in FIG. 10, the method in this embodiment may include the following steps.

Step 1001: User equipment receives a fifth indication message sent by first user equipment, where the fifth indication message is a message sent by the first user equipment to the user equipment when the first user equipment determines that a V2V resource in a third resource pool is already occupied by the user equipment, and the fifth indication message carries location information of the V2V resource occupied by the user equipment in the third resource pool.

In this embodiment, when the user equipment queries a fourth resource pool and knows that a quantity of blocks of idle V2V resources having a same size in the fourth resource pool is less than a fourth preset threshold, the user equipment may query a quantity of blocks of idle V2V resources in the third resource pool, and when the quantity of the blocks of the idle V2V resources in the third resource pool is not less than the third preset threshold, the user equipment may contend for the V2V resource in the third resource pool.

In this case, when first user equipment arrives and is to contend for a V2V resource in the third resource pool, the first user equipment queries the quantity of the blocks of the idle V2V resources in the third resource pool, to determine whether the quantity of the blocks of the idle V2V resources having a same size in the third resource pool is less than the third preset threshold. In a specific implementation manner, the user equipment may directly determine whether the quantity of the blocks of the idle V2V resources is less than the third preset threshold, or may determine whether a ratio of the quantity of the blocks of the idle V2V resources to a quantity of blocks of all V2V resources in the third resource pool is less than a preset value. When knowing that the quantity of the blocks of the idle V2V resources is greater than or equal to the third preset threshold, the user equipment contends for the V2V resource in the third resource pool, and when knowing that the quantity of the idle V2V resources is less than the third preset threshold and there is user equipment occupying a V2V resource in the third resource pool, the first user equipment sends the fifth indication message to at least one user equipment occupying the V2V resource in the third resource pool. The third preset threshold and the fourth preset threshold may be set according to actual application, and specific values of the third preset threshold and the fourth preset threshold are not particularly limited in the present invention.

Step 1002: The user equipment releases the occupied V2V resource in the third resource pool according to the location information of the V2V resource in the fifth indication message.

In this embodiment, after receiving the fifth indication message sent by the first user equipment, the user equipment releases the occupied V2V resource in the third resource pool according to the location information of the V2V resource in the fifth indication message, and re-contends for the V2V resource in the fourth resource pool.

In the V2V-based resource allocation method provided in this embodiment of the present invention, when a quantity of blocks of V2V resources in a third resource pool is less than a third preset threshold, and there is user equipment occupying a V2V resource in the third resource pool, first user equipment instructs the user equipment to release the occupied V2V resource in the third resource pool, and obtains a V2V resource from the V2V resource released by the user equipment, thereby resolving a technical problem that quality of service of user equipment of a high priority type cannot be ensured, and avoiding a case in the conventional art in which the user equipment of the high priority type cannot obtain a V2V resource when V2V resources are insufficient. Therefore, when the V2V resources in the third resource pool are insufficient, the user equipment of the high priority type preferentially obtains a V2V resource, thereby ensuring that a message of the high-priority user equipment can be sent in time, and better ensuring the quality of service of the high-priority user equipment.

Figure 11:
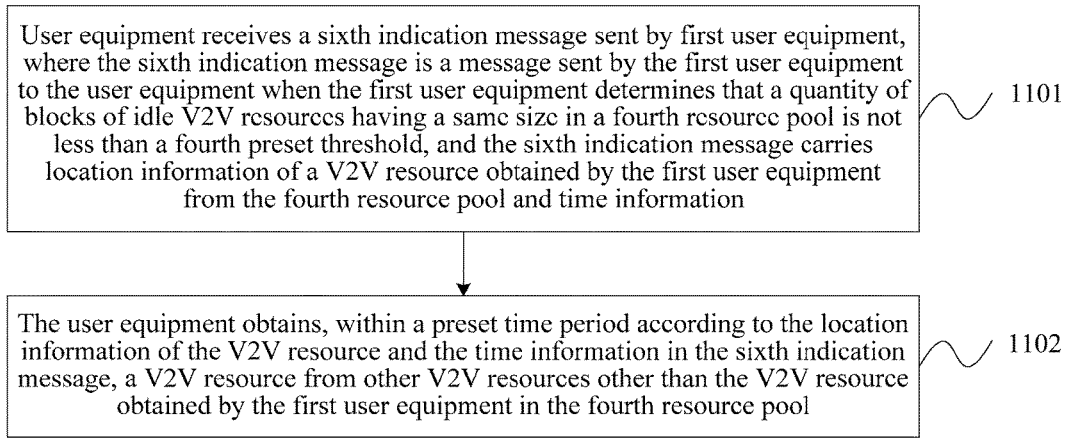
FIG. 11 is a schematic flowchart of a V2V-based resource allocation method according to yet another embodiment of the present invention.

FIG. 11 is a schematic flowchart of a V2V-based resource allocation method according to yet another embodiment of the present invention. Based on the embodiment shown in FIG. 10, in this embodiment, an embodiment of obtaining, by the user equipment, a V2V resource in a manner of contention when no base station performs scheduling is described in detail. As shown in FIG. 10, the method in this embodiment may include the following steps.

Step 1101: The user equipment receives a sixth indication message sent by the first user equipment, where the sixth indication message is a message sent by the first user equipment to the user equipment when the first user equipment determines that a quantity of blocks of idle V2V resources having a same size in a fourth resource pool is not less than a fourth preset threshold, and the sixth indication message carries location information of a V2V resource obtained by the first user equipment from the fourth resource pool and time information.

In this embodiment, after the first user equipment obtains through querying the quantity of the blocks of the idle V2V resources having a same size in the third resource pool, if the first user equipment knows that the quantity of the blocks of the idle V2V resources is less than the third preset threshold, and the quantity of the blocks of the idle V2V resources in the fourth resource pool is not less than the fourth preset threshold, the first user equipment may obtain the V2V resource from the fourth resource pool and send the sixth indication message to the user equipment.

Step 1102: The user equipment obtains, within a preset time period according to the location information of the V2V resource and the time information in the sixth indication message, a V2V resource from other V2V resources other than the V2V resource obtained by the first user equipment in the fourth resource pool.

In this embodiment, after receiving the sixth indication message sent by the first user equipment, the user equipment cannot contend for, within the preset time period according to the location information of the V2V resource and the time information that are carried in the sixth indication message, the V2V resource occupied by the first user equipment in the fourth resource pool. That is, the user equipment can contend for, within the preset time period, the required V2V resource only in another V2V resource other than the V2V resource obtained by the first user equipment in the fourth resource pool.

Optionally, after the preset time period, the first user equipment releases the occupied V2V resource in the fourth resource pool, and may further send a resource release message to the user equipment. The user equipment determines, according to a resource release status in the resource release message, whether the first user equipment releases the resource successfully; if the first user equipment releases the resource successfully, the user equipment obtains the V2V resource from the fourth resource pool after the first user equipment releases the occupied V2V resource in the fourth resource pool.

In the V2V-based resource allocation method provided in this embodiment of the present invention, when a quantity of blocks of V2V resources in a third resource pool is less than a third preset threshold, and a quantity of blocks of idle V2V resources in a fourth resource pool is not less than a fourth preset threshold, user equipment may obtain a V2V resource from the fourth resource pool, thereby resolving a technical problem that quality of service of user equipment of a high priority type cannot ensured, and avoiding a case in the conventional art in which the user equipment of the high priority type cannot obtain a V2V resource when V2V resources are insufficient. Therefore, when the V2V resources in the third resource pool are insufficient, the user equipment of the high priority type preferentially obtains a V2V resource, thereby ensuring that a message of the user equipment of the high priority type can be sent in time, and better ensuring the quality of service of the high-priority user equipment. In addition, resource allocation is more flexible.

Figure 12:
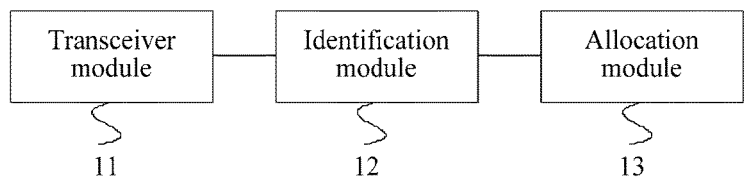
FIG. 12 is a schematic structural diagram of a V2V-based resource allocation apparatus according to an embodiment of the present invention.

FIG. 12 is a schematic structural diagram of a V2V-based resource allocation apparatus according to an embodiment of the present invention. As shown in FIG. 12, the V2V-based resource allocation apparatus provided in this embodiment of the present invention includes a transceiver module 11, an identification module 12, and an allocation module 13.

The transceiver module 11 is configured to receive a resource request message sent by first user equipment; the identification module 12 is configured to identify, according to the resource request message sent by the transceiver module 11, a level type corresponding to the first user equipment; and the allocation module 13 is configured to: when the identification module 12 identifies that the level type corresponding to the first user equipment is a high priority type, and a quantity of blocks of idle V2V resources having a same size in a first resource pool is less than a first preset threshold, or when the identification module 12 identifies that a quantity of required resource blocks that is calculated according to an amount of data to be sent by the first user equipment and a modulation and coding scheme is greater than a quantity of blocks of idle V2V resources in a first resource pool, allocate a V2V resource to the first user equipment from V2V resources occupied by second user equipment in the first resource pool or from a second resource pool corresponding to another type other than the high priority type, where the V2V resource is used by the first user equipment to transmit V2V data, the first resource pool is a resource pool corresponding to the high priority type, and the second user equipment is user equipment of another type other than the high priority type.

In the V2V-based resource allocation apparatus provided in this embodiment of the present invention, the apparatus receives a resource request message sent by first user equipment; identifies, according to the resource request message, a level type corresponding to the first user equipment; and if identifying that the level type corresponding to the first user equipment is a high priority type, and a quantity of blocks of idle V2V resources having a same size in a first resource pool is less than a first preset threshold, or a quantity of required resource blocks that is calculated by a base station according to an amount of data to be sent by the first user equipment and a modulation and coding scheme is greater than a quantity of blocks of idle V2V resources in a first resource pool, allocates a V2V resource to the first user equipment from V2V resources occupied by second user equipment in the first resource pool or from a second resource pool corresponding to another type other than the high priority type, where the V2V resource is used by the first user equipment to transmit V2V data, the first resource pool is a resource pool corresponding to the high priority type, and the second user equipment is user equipment of another type other than the high priority type. When the quantity of the blocks of the idle V2V resources having a same size in the first resource pool is less than the first preset threshold, or the quantity of the required resource blocks that is calculated by the base station according to the amount of the data to be sent by the first user equipment and the modulation and coding scheme is greater than the quantity of the blocks of the idle V2V resources in the first resource pool, the V2V resource is scheduled for the first user equipment from the V2V resource occupied by the second user equipment in the first resource pool or from the second resource pool, thereby resolving a technical problem that quality of service of user equipment of a high priority type cannot be ensured, and avoiding a case in the conventional art in which the user equipment of the high priority type cannot obtain a V2V resource when V2V resources are insufficient. Therefore, when the V2V resources are insufficient, the user equipment of the high priority type may preferentially obtain a V2V resource, thereby ensuring that a message of the user equipment of the high priority type can be sent in time, and better ensuring the quality of service of the high-priority user equipment.

Figure 13:
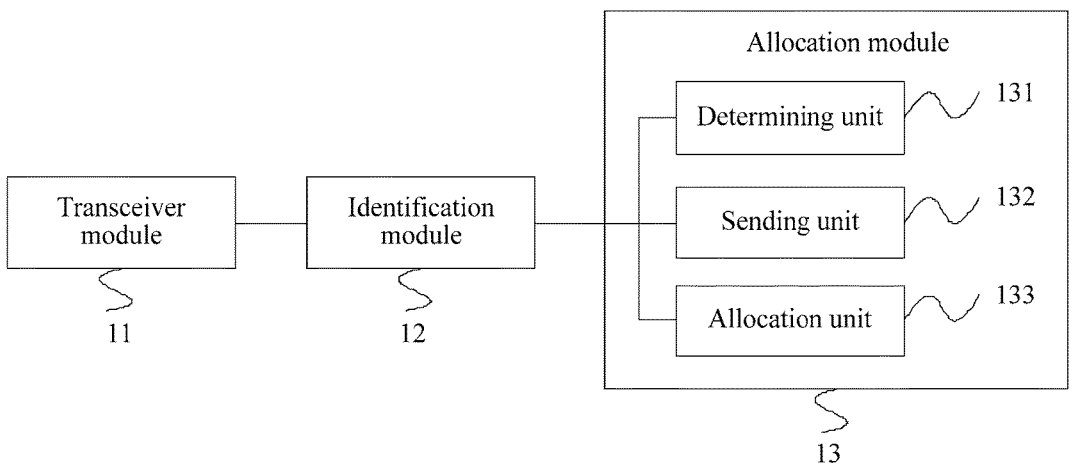
FIG. 13 is a schematic structural diagram of a V2V-based resource allocation apparatus according to another embodiment of the present invention.

FIG. 13 is a schematic structural diagram of a V2V-based resource allocation apparatus according to another embodiment of the present invention. As shown in FIG. 13, based on the embodiment shown in FIG. 12, in this embodiment, the allocation module 13 further includes a determining unit 131, a sending unit 132, and an allocation unit 133.

The determining unit 131 is configured to determine whether a V2V resource in the first resource pool is occupied by the second user equipment; the sending unit 132 is configured to: when the determining unit 131 determines that the V2V resource in the first resource pool is already occupied by the second user equipment, send a first indication message to the second user equipment, where the first indication message is used to instruct the second user equipment to release the occupied V2V resource in the first resource pool; and the allocation unit 133 is configured to: after the sending unit 132 sends the first indication message, allocate the V2V resource to the first user equipment from the V2V resource released by the second user equipment.

The V2V-based resource allocation apparatus in this embodiment may be configured to execute the technical solutions of the V2V-based resource allocation method provided in the embodiment shown in FIG. 2 of the present invention. Implementation principles and technical effects are similar, and details are not described herein again.

Figure 14:
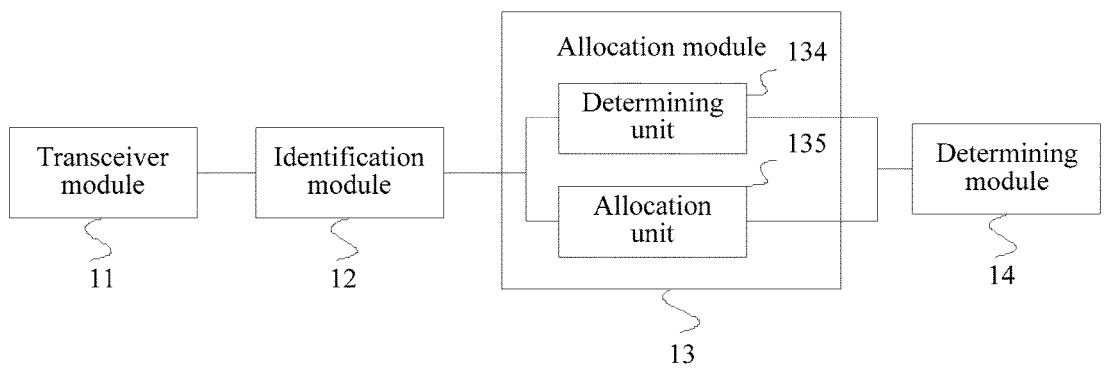
FIG. 14 is a schematic structural diagram of a V2V-based resource allocation apparatus according to still another embodiment of the present invention.

FIG. 14 is a schematic structural diagram of a V2V-based resource allocation apparatus according to still another embodiment of the present invention. As shown in FIG. 14, based on the embodiment shown in FIG. 12, in this embodiment, the allocation module 13 further includes a determining unit 134 and an allocation unit 135.

The determining unit 134 is configured to: determine whether a quantity of blocks of idle V2V resources having a same size in the second resource pool is not less than a second preset threshold, or determine whether the quantity of the required resource blocks that is calculated according to the amount of the data to be sent by the first user equipment and the modulation and coding scheme is not greater than a quantity of blocks of idle V2V resources in the second resource pool; and the allocation unit 135 is configured to: when the determining unit 134 determines that the quantity of the blocks of the idle V2V resources having a same size in the second resource pool is not less than the second preset threshold, or when the determining unit 134 determines that the quantity of the required resource blocks that is calculated according to the amount of the data to be sent by the first user equipment and the modulation and coding scheme is less than the quantity of the blocks of the idle V2V resources in the second resource pool, allocate the V2V resource to the first user equipment from the second resource pool.

The V2V-based resource allocation apparatus in this embodiment may be configured to execute the technical solutions of the V2V-based resource allocation method provided in the embodiment shown in FIG. 3 of the present invention. Implementation principles and technical effects are similar, and details are not described herein again.

Optionally, the transceiver module 11 is further configured to send a second indication message to the second user equipment, where the second indication message carries location information of the V2V resource allocated to the first user equipment in the second resource pool, and the second indication message is used to instruct the second user equipment to obtain, according to the location information of the V2V resource, the V2V resource from other V2V resources other than the V2V resource allocated to the first user equipment in the second resource pool.

Optionally, the apparatus further includes a determining module 14, where the determining module 14 is configured to: determine, every a preset time, whether the quantity of the blocks of the idle V2V resources having a same size in the first resource pool is not less than the first preset threshold, or determine, every a preset time, whether the quantity of the required resource blocks that is calculated according to the amount of the data to be sent by the first user equipment and the modulation and coding scheme is less than the quantity of the blocks of the idle V2V resources in the first resource pool; the allocation module 13 is further configured to: when the determining module 14 determines that the quantity of the blocks of the idle V2V resources having a same size in the first resource pool is not less than the first preset threshold, or when the determining module 14 determines that the quantity of the required resource blocks that is calculated according to the amount of the data to be sent by the first user equipment and the modulation and coding scheme is less than the quantity of the blocks of the idle V2V resources in the first resource pool, allocate the V2V resource to the first user equipment from the first resource pool; and the transceiver module 11 is further configured to: when the determining module 14 determines that the quantity of the blocks of the idle V2V resources having a same size in the first resource pool is not less than the first preset threshold, or when the determining module 14 determines that the quantity of the required resource blocks that is calculated according to the amount of the data to be sent by the first user equipment and the modulation and coding scheme is less than the quantity of the blocks of the idle V2V resources in the first resource pool, send a third indication message to the first user equipment, where the third indication message is used to instruct the first user equipment to release the occupied V2V resource in the second resource pool.

Optionally, the transceiver module 11 is further configured to send a fourth indication message to the second user equipment, where the fourth indication message carries the location information of the V2V resource released by the first user equipment, and the fourth indication message is used to instruct the second user equipment to obtain, according to the location information of the V2V resource, the V2V resource from the second resource pool after the first user equipment releases the occupied V2V resource in the second resource pool.

The V2V-based resource allocation apparatus in this embodiment may be configured to execute the technical solutions of the V2V-based resource allocation method provided in the embodiment shown in FIG. 3 of the present invention. Implementation principles and technical effects are similar, and details are not described herein again.

Figure 15:
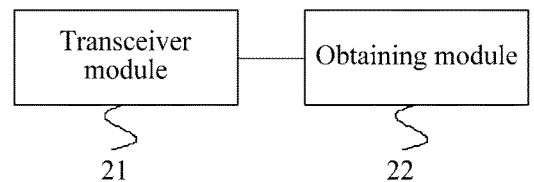
FIG. 15 is a schematic structural diagram of a V2V-based resource allocation apparatus according to yet another embodiment of the present invention.

FIG. 15 is a schematic structural diagram of a V2V-based resource allocation apparatus according to yet another embodiment of the present invention. As shown in FIG. 15, the V2V-based resource allocation apparatus provided in this embodiment of the present invention includes a transceiver module 21 and an obtaining module 22.

The transceiver module 21 is configured to send a resource request message to a base station, where the resource request message is used to instruct the base station to identify a level type corresponding to the user equipment; the obtaining module 22 is configured to: after the transceiver module 21 sends the resource request message to the base station, obtain, from the base station, a V2V resource allocated by the base station, where the allocated V2V resource is a V2V resource allocated by the base station, when the base station determines that the level type corresponding to the user equipment is a high priority type, and a quantity of blocks of idle V2V resources having a same size in a first resource pool is less than a first preset threshold, or a quantity of required resource blocks that is calculated by the base station according to an amount of data to be sent by the user equipment and a modulation and coding scheme is greater than a quantity of blocks of idle V2V resources in a first resource pool, from V2V resources occupied by second user equipment in the first resource pool or from a second resource pool corresponding to another type other than the high priority type, the first resource pool is a resource pool corresponding to the high priority type, and the second user equipment is user equipment of another type other than the high priority type; and the transceiver module 21 is further configured to transmit V2V data according to the V2V resource obtained by the obtaining module 22.

In the V2V-based resource allocation apparatus provided in this embodiment of the present invention, the user equipment sends a resource request message to a base station, to instruct the base station to identify a level type corresponding to the user equipment; the user equipment obtains, from the base station, a V2V resource allocated by the base station, where the allocated V2V resource is a V2V resource allocated by the base station, when the base station determines that the level type corresponding to the user equipment is a high priority type, and a quantity of blocks of idle V2V resources having a same size in a first resource pool is less than a first preset threshold, or a quantity of required resource blocks that is calculated by the base station according to an amount of data to be sent by the user equipment and a modulation and coding scheme is greater than a quantity of blocks of idle V2V resources in a first resource pool, from V2V resources occupied by second user equipment in the first resource pool or from a second resource pool corresponding to another type other than the high priority type; and the user equipment transmits V2V data according to the allocated V2V resource. When the quantity of the blocks of the idle V2V resources having a same size in the first resource pool is less than the first preset threshold, or the quantity of the required resource blocks that is calculated by the base station according to the amount of the data to be sent by the user equipment and the modulation and coding scheme is greater than the quantity of the blocks of the idle V2V resources in the first resource pool, the V2V resource is scheduled for the user equipment from the V2V resource occupied by the second user equipment in the first resource pool or from the second resource pool, thereby resolving a technical problem that quality of service of user equipment of a high priority type cannot be ensured, and avoiding a case in the conventional art in which the user equipment of the high priority type cannot obtain a V2V resource when V2V resources are insufficient. Therefore, when the V2V resources are insufficient, the user equipment of the high priority type may preferentially obtain a V2V resource, thereby ensuring that a message of the user equipment of the high priority type can be sent in time, and better ensuring the quality of service of the high-priority user equipment.

Figure 16:
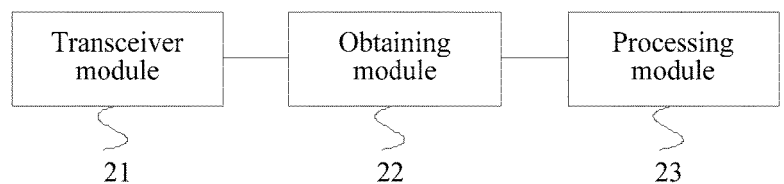
FIG. 16 is a schematic structural diagram of a V2V-based resource allocation apparatus according to yet another embodiment of the present invention.

FIG. 16 is a schematic structural diagram of a V2V-based resource allocation apparatus according to yet another embodiment of the present invention. As shown in FIG. 16, based on the embodiment shown in FIG. 15, in this embodiment, the allocation module 13 further includes a processing module 23.

The transceiver module 21 is further configured to receive a third indication message sent by the base station, where the third indication message is a message generated by the base station when the base station determines, every a preset time, that the quantity of the blocks of the idle V2V resources having a same size in the first resource pool is not less than the first preset threshold, or the quantity of the required resource blocks that is calculated by the base station according to the amount of the data to be sent by the first user equipment and the modulation and coding scheme is less than the quantity of the blocks of the idle V2V resources in the first resource pool; the processing module 23 is configured to release the occupied V2V resource in the second resource pool according to the third indication message received by the transceiver module 21; and the transceiver module 21 is further configured to receive the V2V resource that is allocated by the base station from the first resource pool.

The V2V-based resource allocation apparatus in this embodiment may be configured to execute the technical solutions of the V2V-based resource allocation method provided in the embodiment shown in FIG. 5 of the present invention. Implementation principles and technical effects are similar, and details are not described herein again.

Figure 17:
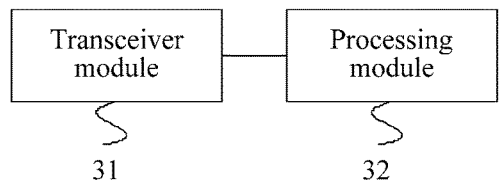
FIG. 17 is a schematic structural diagram of a V2V-based resource allocation apparatus according to yet another embodiment of the present invention.

FIG. 17 is a schematic structural diagram of a V2V-based resource allocation apparatus according to yet another embodiment of the present invention. As shown in FIG. 17, the V2V-based resource allocation apparatus provided in this embodiment of the present invention includes a transceiver module 31 and a processing module 32.

The transceiver module 31 is configured to receive a first indication message sent by a base station, where the first indication message is a message that is generated by the base station when the base station determines that a V2V resource in a first resource pool is already occupied by the user equipment, and the first resource pool is a resource pool corresponding to a high priority type; and the processing module 32 is configured to release the occupied V2V resource in the first resource pool according to the first indication message received by the transceiver module 31.

In the V2V-based resource allocation apparatus provided in this embodiment of the present invention, the user equipment receives a first indication message sent by a base station, where the first indication message is a message generated by the base station when the base station determines that a V2V resource in a first resource pool is already occupied by the user equipment, and the user equipment releases the occupied V2V resource in the first resource pool according to the first indication message. Because when V2V resources in a second resource pool are insufficient, the user equipment may occupy the V2V resource in the first resource pool, if first user equipment requests to allocate a resource, the base station schedules the user equipment to release the occupied V2V resource in the first resource pool, thereby resolving a technical problem that quality of service of user equipment of a high priority type cannot be ensured, and avoiding a case in the conventional art in which the user equipment of the high priority type cannot obtain a V2V resource when V2V resources are insufficient. Therefore, when the V2V resources in the first resource pool are insufficient, a V2V resource is preferentially scheduled for the user equipment of the high priority type, thereby ensuring that a message of the user equipment of the high priority type can be sent in time, and better ensuring the quality of service of the user equipment of the high priority type.

Figure 18:
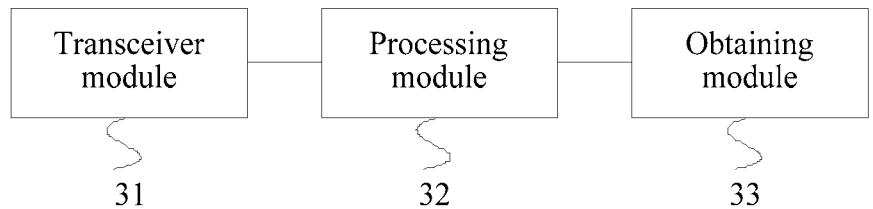
FIG. 18 is a schematic structural diagram of a V2V-based resource allocation apparatus according to yet another embodiment of the present invention.

FIG. 18 is a schematic structural diagram of a V2V-based resource allocation apparatus according to yet another embodiment of the present invention. As shown in FIG. 18, based on the embodiment shown in FIG. 17, in this embodiment, the apparatus further includes an obtaining unit 33.

The transceiver module 31 is further configured to receive a second indication message sent by the base station, where the second indication message is a message generated by the base station when the base station determines that a quantity of blocks of idle V2V resources having a same size in a second resource pool is not less than a second preset threshold, or a quantity of required resource blocks that is calculated by the base station according to an amount of data to be sent by first user equipment and a modulation and coding scheme is less than a quantity of blocks of idle V2V resources in a second resource pool, the second indication message carries location information of a V2V resource allocated by the base station to the first user equipment in the second resource pool, the second resource pool is a resource pool corresponding to another type other than the high priority type, and the first user equipment is user equipment of the high priority type; and the obtaining module 33 is configured to obtain, according to the location information of the V2V resource in the second indication message received by the transceiver module 31, the V2V resource from other V2V resources other than the V2V resource occupied by the first user equipment in the second resource pool.

The V2V-based resource allocation apparatus in this embodiment may be configured to execute the technical solutions of the V2V-based resource allocation method provided in any embodiment of the present invention. Implementation principles and technical effects are similar, and details are not described herein again.

Figure 19:
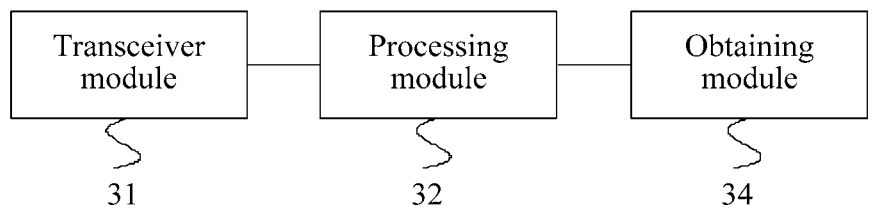
FIG. 19 is a schematic structural diagram of a V2V-based resource allocation apparatus according to yet another embodiment of the present invention.

FIG. 19 is a schematic structural diagram of a V2V-based resource allocation apparatus according to yet another embodiment of the present invention. As shown in FIG. 19, based on the embodiment shown in FIG. 17, in this embodiment, the apparatus further includes an obtaining unit 34.

The transceiver module 31 is further configured to receive a fourth indication message sent by the base station, where the fourth indication message is a message generated by the base station when the base station determines that a quantity of blocks of idle V2V resources having a same size in the first resource pool is not less than a first preset threshold, or a quantity of required resource blocks that is calculated by the base station according to an amount of data to be sent by first user equipment and a modulation and coding scheme is less than a quantity of blocks of idle V2V resources in the first resource pool, the fourth indication message carries location information of a V2V resource released by the first user equipment; and the obtaining module 34 is configured to obtain, according to the location information of the V2V resource in the fourth indication message received by the transceiver module 31, the V2V resource from the second resource pool after the first user equipment releases the occupied V2V resource in the second resource pool.

The V2V-based resource allocation apparatus in this embodiment may be configured to execute the technical solutions of the V2V-based resource allocation method provided in any embodiment of the present invention. Implementation principles and technical effects are similar, and details are not described herein again.

Figure 20:
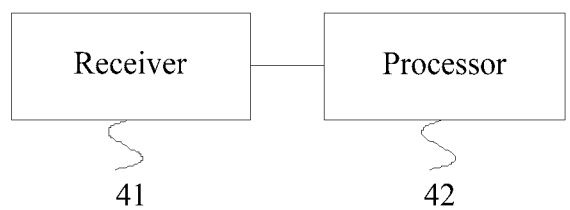
FIG. 20 is a schematic structural diagram of a base station according to an embodiment of the present invention.

FIG. 20 is a schematic structural diagram of a base station according to an embodiment of the present invention. As shown in FIG. 20, the base station provided in the present invention includes a receiver 41 and a processor 42.

The receiver 41 is configured to receive a resource request message sent by first user equipment; the processor 42 is configured to identify, according to the resource request message received by the receiver 41, a level type corresponding to the first user equipment; and the processor 42 is further configured to: when identifying that the level type corresponding to the first user equipment is a high priority type, and a quantity of blocks of idle V2V resources having a same size in a first resource pool is less than a first preset threshold, or when identifying that a quantity of required resource blocks that is calculated according to an amount of data to be sent by the first user equipment and a modulation and coding scheme is greater than a quantity of blocks of idle V2V resources in a first resource pool, allocate a V2V resource to the first user equipment from V2V resources occupied by second user equipment in the first resource pool or from a second resource pool corresponding to another type other than the high priority type, where the V2V resource is used by the first user equipment to transmit V2V data, the first resource pool is a resource pool corresponding to the high priority type, and the second user equipment is user equipment of another type other than the high priority type.

The base station in this embodiment may be configured to execute the technical solutions of the V2V-based resource allocation method provided in the embodiment shown in FIG. 1 of the present invention. Implementation principles and technical effects are similar, and details are not described herein again.

Figure 21:
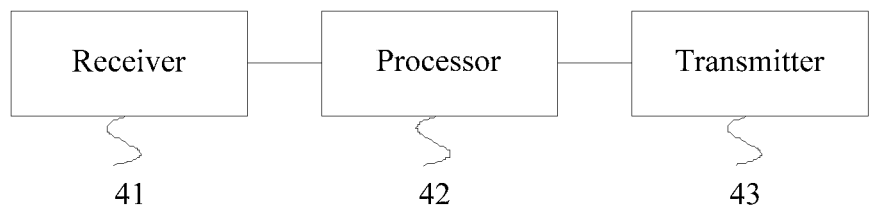
FIG. 21 is a schematic structural diagram of a base station according to another embodiment of the present invention.

FIG. 21 is a schematic structural diagram of a base station according to another embodiment of the present invention. As shown in FIG. 21, based on the embodiment shown in FIG. 20, in this embodiment, the base station further includes a transmitter 43.

The processor 42 is configured to determine whether a V2V resource in the first resource pool is occupied by the second user equipment; the transmitter 43 is configured to: when the processor 42 determines that the V2V resource in the first resource pool is already occupied by the second user equipment, send a first indication message to the second user equipment, where the first indication message is used to instruct the second user equipment to release the occupied V2V resource in the first resource pool; and the processor 42 is further configured to: after the transmitter 43 sends the first indication message, allocate the V2V resource to the first user equipment from the V2V resource released by the second user equipment.

Optionally, the processor 42 is further configured to: when determining that a quantity of blocks of idle V2V resources having a same size in the second resource pool is not less than a second preset threshold, or when determining that the quantity of the required resource blocks that is calculated according to the amount of the data to be sent by the first user equipment and the modulation and coding scheme is less than a quantity of blocks of idle V2V resources in the second resource pool, allocate the V2V resource to the first user equipment from the second resource pool.

Optionally, the transmitter 43 is further configured to send a second indication message to the second user equipment, where the second indication message carries location information of the V2V resource allocated to the first user equipment in the second resource pool, and the second indication message is used to instruct the second user equipment to obtain, according to the location information of the V2V resource, the V2V resource from other V2V resources other than the V2V resource allocated to the first user equipment in the second resource pool.

Optionally, the processor 42 is further configured to: when determining, every a preset time, that the quantity of the blocks of the idle V2V resources having a same size in the first resource pool is not less than the first preset threshold, or when determining, every a preset time, that the quantity of the required resource blocks that is calculated according to the amount of the data to be sent by the first user equipment and the modulation and coding scheme is less than the quantity of the blocks of the idle V2V resources in the first resource pool, allocate the V2V resource to the first user equipment from the first resource pool; and the transmitter 43 is further configured to: when the processor 42 determines that the quantity of the blocks of the idle V2V resources having a same size in the first resource pool is not less than the first preset threshold, or when the processor 42 determines that the quantity of the required resource blocks that is calculated according to the amount of the data to be sent by the first user equipment and the modulation and coding scheme is less than the quantity of the blocks of the idle V2V resources in the first resource pool, send a third indication message to the first user equipment, where the third indication message is used to instruct the first user equipment to release the occupied V2V resource in the second resource pool.

Optionally, the transmitter 43 is further configured to send a fourth indication message to the second user equipment, where the fourth indication message carries the location information of the V2V resource released by the first user equipment, and the fourth indication message is used to instruct the second user equipment to obtain, according to the location information of the V2V resource, the V2V resource from the second resource pool after the first user equipment releases the occupied V2V resource in the second resource pool.

The base station in this embodiment may be configured to execute the technical solutions of the V2V-based resource allocation method provided in any embodiment of the present invention. Implementation principles and technical effects are similar, and details are not described herein again.

Figure 22:
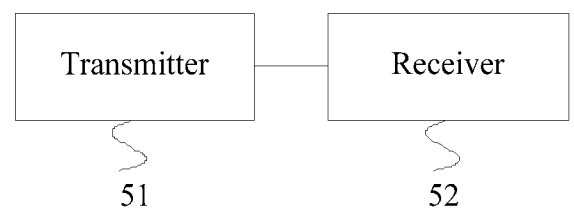
FIG. 22 is a schematic structural diagram of user equipment according to an embodiment of the present invention.

FIG. 22 is a schematic structural diagram of user equipment according to an embodiment of the present invention. As shown in FIG. 22, the user equipment in the present invention includes a transmitter 51 and a receiver 52.

The transmitter 51 is configured to send a resource request message to a base station, where the resource request message is used to instruct the base station to identify a level type corresponding to the user equipment; the receiver 52 is configured to: after the transmitter 51 sends the resource request message, obtain, from the base station, a V2V resource allocated by the base station, where the allocated V2V resource is a V2V resource allocated by the base station, when the base station determines that the level type corresponding to the user equipment is a high priority type, and a quantity of blocks of idle V2V resources having a same size in a first resource pool is less than a first preset threshold, or a quantity of required resource blocks that is calculated by the base station according to an amount of data to be sent by the user equipment and a modulation and coding scheme is greater than a quantity of blocks of idle V2V resources in a first resource pool, from V2V resources occupied by second user equipment in the first resource pool or from a second resource pool corresponding to another type other than the high priority type, the first resource pool is a resource pool corresponding to the high priority type, and the second user equipment is user equipment of another type other than the high priority type; and the transmitter 51 is further configured to transmit V2V data according to the V2V resource received by the receiver 52.

The user equipment in this embodiment may be configured to execute the technical solutions of the V2V-based resource allocation method provided in any embodiment of the present invention. Implementation principles and technical effects are similar, and details are not described herein again.

Figure 23:
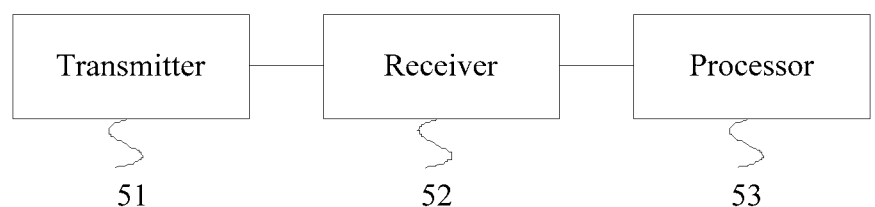
FIG. 23 is a schematic structural diagram of user equipment according to another embodiment of the present invention.

FIG. 23 is a schematic structural diagram of user equipment according to another embodiment of the present invention. As shown in FIG. 23, based on the embodiment shown in FIG. 22, in this embodiment, the user equipment further includes a processor 53.

The receiver 52 is further configured to receive a third indication message sent by the base station, where the third indication message is a message generated by the base station when the base station determines, every a preset time, that the quantity of the blocks of the idle V2V resources having a same size in the first resource pool is not less than the first preset threshold, or the quantity of the required resource blocks that is calculated by the base station according to the amount of the data to be sent by the first user equipment and the modulation and coding scheme is less than the quantity of the blocks of the idle V2V resources in the first resource pool; the processor 53 is configured to release the occupied V2V resource in the second resource pool according to the third indication message received by the receiver 52; and the receiver 52 is further configured to receive the V2V resource that is allocated by the base station from the first resource pool.

The user equipment in this embodiment may be configured to execute the technical solutions of the V2V-based resource allocation method provided in any embodiment of the present invention. Implementation principles and technical effects are similar, and details are not described herein again.

Figure 24:
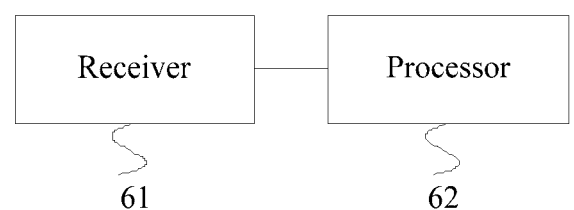
FIG. 24 is a schematic structural diagram of user equipment according to an embodiment of the present invention.

FIG. 24 is a schematic structural diagram of user equipment according to an embodiment of the present invention. As shown in FIG. 24, the user equipment provided in the present invention includes a receiver 61 and a processor 62.

The receiver 61 is configured to receive a first indication message sent by a base station, where the first indication message is a message that is generated by the base station when the base station determines that a V2V resource in a first resource pool is already occupied by the user equipment, and the first resource pool is a resource pool corresponding to a high priority type; and the processor 62 is configured to release the occupied V2V resource in the first resource pool according to the first indication message received by the receiver 61.

The user equipment provided in this embodiment may be configured to execute the technical solutions of the V2V-based resource allocation method provided in any embodiment of the present invention. Implementation principles and technical effects are similar, and details are not described herein again.

Optionally, the receiver 61 is further configured to receive a second indication message sent by the base station, where the second indication message is a message generated by the base station when the base station determines that a quantity of blocks of idle V2V resources having a same size in a second resource pool is not less than a second preset threshold, or a quantity of required resource blocks that is calculated by the base station according to an amount of data to be sent by first user equipment and a modulation and coding scheme is less than a quantity of blocks of idle V2V resources in a second resource pool, the second indication message carries location information of a V2V resource allocated by the base station to the first user equipment in the second resource pool, the second resource pool is a resource pool corresponding to another type other than the high priority type, and the first user equipment is user equipment of the high priority type; and the processor 62 is further configured to obtain, according to the location information of the V2V resource in the second indication message received by the receiver 61, the V2V resource from other V2V resources other than the V2V resource occupied by the first user equipment in the second resource pool.

Optionally, the receiver 61 is further configured to receive a fourth indication message sent by the base station, where the fourth indication message is a message generated by the base station when the base station determines that a quantity of blocks of idle V2V resources having a same size in the first resource pool is not less than a first preset threshold, or a quantity of required resource blocks that is calculated by the base station according to an amount of data to be sent by the first user equipment and a modulation and coding scheme is less than a quantity of blocks of idle V2V resources in the first resource pool, and the fourth indication message carries location information of a V2V resource released by the first user equipment; and the processor 62 is further configured to obtain, according to the location information of the V2V resource in the fourth indication message received by the receiver 61, the V2V resource from the second resource pool after the first user equipment releases the occupied V2V resource in the second resource pool.

The user equipment provided in this embodiment may be configured to execute the technical solutions of the V2V-based resource allocation method provided in any embodiment of the present invention. Implementation principles and technical effects are similar, and details are not described herein again.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A vehicle-to-vehicle (V2V)-based resource allocation method comprising:

receiving, by a base station, a resource request message sent by a first user equipment;

identifying, by the base station and according to the resource request message, a level type associated with the first user equipment;

allocating, by the base station, a V2V resource to the first user equipment from V2V resources occupied by a second user equipment in a first resource pool or from a second resource pool associated with another type other than a high priority type when the base station identifies that the level type associated with the first user equipment is the high priority type, and one of the following situations occur:

(a) a quantity of blocks of idle V2V resources having a same size in the first resource pool is less than a first preset threshold, and (b) a quantity of required resource blocks is determined by the base station, according to an amount of data to be sent by the first user equipment and a modulation and coding scheme, to be greater than a quantity of blocks of idle V2V resources in a first resource pool, wherein the V2V resource is used by the first user equipment to transmit V2V data, the first resource pool is a resource pool associated with the high priority type, and the second user equipment is of the another type;

allocating, by the base station, the V2V resource to the first user equipment from the second resource pool when the V2V resource allocated to the first user equipment is from the second resource pool, and when one of the following situations occur:

(a) a quantity of blocks of idle V2V resources having a same size in the second resource pool is not less than a second preset threshold, and (b) the quantity of the required resource blocks obtained by the base station, according to the amount of the data to be sent by the first user equipment and the modulation and coding scheme, is not greater than the quantity of blocks of idle V2V resources in the second resource pool, allocating, by the base station, the V2V resource to the first user equipment from the first resource pool when one of the following situations occur:

(a) the quantity of the blocks of the idle V2V resources having a same size in the first resource pool is not less than the first preset threshold, and (b) the quantity of the required resource blocks obtained by the base station, according to the amount of the data to be sent by the first user equipment and the modulation and coding scheme, is not greater than the quantity of the blocks of the idle V2V resources in the first resource pool, and sending, by the base station, a third indication message to the first user equipment, wherein the third indication message is used to instruct the first user equipment to release the occupied V2V resource in the second resource pool.

2. The method according to claim 1, wherein allocating the V2V resource to the first user equipment from the V2V resources comprises:

sending, by the base station, a first indication message to the second user equipment when determining that a V2V resource in the first resource pool is occupied by the second user equipment, wherein the first indication message instructs the second user equipment to release the occupied V2V resource in the first resource pool; and allocating, by the base station, the V2V resource to the first user equipment from the V2V resource released by the second user equipment.

3. The method according to claim 1, further comprising:

sending, by the base station, a second indication message to the second user equipment, wherein the second indication message carries location information of the V2V resource allocated to the first user equipment in the second resource pool, and the second indication message instructs the second user equipment to obtain, according to the location information of the V2V resource, the V2V resource from other V2V resources rather than the V2V resource allocated to the first user equipment in the second resource pool.

4. The method according to claim 1, further comprising:

sending, by the base station, a fourth indication message to the second user equipment, wherein the fourth indication message carries location information of the V2V resource released by the first user equipment, and the fourth indication message instructs the second user equipment to obtain, according to the location information of the V2V resource, the V2V resource from the second resource pool after the first user equipment releases the occupied V2V resource in the second resource pool.

5. A base station comprising:

a processor;

a receiver configured to cooperate with the processor to receive a resource request message sent by a first user equipment; and the processor configured to provide at least the following operations:

identify, according to the resource request message received by the receiver, a level type associated with the first user equipment, allocate a vehicle-to-vehicle (V2V) resource to the first user equipment from V2V resources occupied by a second user equipment in a first resource pool or from a second resource pool associated with another type other than a high priority type when a level type associated with the first user equipment is the high priority type, and one of the following situations occur:

(a) a quantity of blocks of idle V2V resources having a same size in the first resource pool is less than a first preset threshold, and (b) a quantity of required resource blocks determined, according to an amount of data to be sent by the first user equipment and a modulation and coding scheme, to be greater than a quantity of blocks of idle V2V resources in the first resource pool, wherein the V2V resource is used by the first user equipment to transmit V2V data, the first resource pool is a resource pool associated with the high priority type, and the second user equipment is of the another type; and allocate the V2V resource to the first user equipment from the second resource pool when one of the following situations occur:

(a) a quantity of blocks of idle V2V resources having a same size in the second resource pool is not less than a second preset threshold, and (b) the quantity of the required resource blocks, which is obtained according to the amount of the data to be sent by the first user equipment and the modulation and coding scheme, is not greater than the quantity of blocks of idle V2V resources in the second resource pool;

allocate the V2V resource to the first user equipment from the first resource pool wherein when one of the following situations occur:
  (a) the quantity of the blocks of the idle V2V resources having a same size in the first resource pool is not less than the first preset threshold, and
  (b) the quantity of the required resource blocks, which is obtained according to the amount of the data to be sent by the first user equipment and the modulation and coding scheme, is less than the quantity of the blocks of the idle V2V resources in the first resource pool; and a transmitter configured to cooperate with the processor to send a third indication message to the first user equipment, wherein the third indication message instructs the first user equipment to release the occupied V2V resource in the second resource pool when one of the following situations occur:
  (a) the quantity of the blocks of the idle V2V resources having a same size in the first resource pool is not less than the first preset threshold, and
  (b) the quantity of the required resource blocks, which is obtained according to the amount of the data to be sent by the first user equipment and the modulation and coding scheme, is less than the quantity of the blocks of the idle V2V resources in the first resource pool.

6. The base station according to claim 5, wherein
the processor is further configured to determine whether a V2V resource in the first resource pool is occupied by the second user equipment;
the transmitter is further configured to cooperate with the processor to send a first indication message to the second user equipment when the processor determines that the V2V resource in the first resource pool is already occupied by the second user equipment, wherein the first indication message is used to instruct the second user equipment to release the occupied V2V resource in the first resource pool; and
the processor is further configured to allocate the V2V resource to the first user equipment from the V2V resource released by the second user equipment after the transmitter sends the first indication message.

7. The base station according to claim 6, wherein the transmitter is further configured to send a second indication message to the second user equipment, and
wherein the second indication message carries location information of the V2V resource allocated to the first user equipment in the second resource pool, and the second indication message instructs the second user equipment to obtain, according to the location information of the V2V resource, the V2V resource from other V2V resources rather than the V2V resource allocated to the first user equipment in the second resource pool.

8. The base station according to claim 6, wherein the transmitter is further configured to cooperate with the processor to send a fourth indication message to the second user equipment,
wherein the fourth indication message carries the location information of the V2V resource released by the first user equipment, and the fourth indication message instructs the second user equipment to obtain, according to the location information of the V2V resource, the V2V resource from the second resource pool after the first user equipment releases the occupied V2V resource in the second resource pool.

9. A non-transitory, computer readable medium storing processor executable instructions that, when executed by a processor, configure the processor to provide at least the following operations:
receive a resource request message sent by a first user equipment;
identify, according to the resource request message, a level type associated with the first user equipment;
allocating a vehicle-to-vehicle (V2V) resource to the first user equipment from V2V resources occupied by a second user equipment in a first resource pool or from a second resource pool associated with a type other than a high priority type when the level type associated with the first user equipment is identified as the high priority type and one of the following situations occur:
  (a) a quantity of blocks of idle vehicle-to-vehicle (V2V) resources having a same size in the first resource pool is less than a first preset threshold, and
  (b) a quantity of required resource blocks, which is determined according to an amount of data to be sent by the first user equipment and a modulation and coding scheme, is greater than a quantity of blocks of idle V2V resources in the first resource pool,
wherein the V2V resource is used by the first user equipment to transmit V2V data, the first resource pool is a resource pool associated with the high priority type, and the second user equipment is of the other type;
allocating the V2V resource to the first user equipment from the second resource pool when the V2V resource allocated to the first user equipment is from the second resource pool, and when one of the following situations occur:
  (a) a quantity of blocks of idle V2V resources having a same size in the second resource pool is not less than a second preset threshold, and
  (b) the quantity of the required resource blocks, which is determined according to the amount of the data to be sent by the first user equipment and the modulation and coding scheme, is not greater than the quantity of blocks of idle V2V resources in the second resource pool;
allocating the V2V resource to the first user equipment from the first resource pool when one of the following situations occur:
  (a) the quantity of the blocks of the idle V2V resources having a same size in the first resource pool is not less than the first preset threshold, and
  (b) the quantity of the required resource blocks, which is determined according to the amount of the data to be sent by the first user equipment and the modulation and coding scheme, is not greater than the quantity of the blocks of the idle V2V resources in the first resource pool; and
sending a third indication message to the first user equipment, wherein the third indication message instructs the first user equipment to release the occupied V2V resource in the second resource pool.

10. The non-transitory, computer readable medium according to claim 9, wherein allocating the V2V resource to the first user equipment from the V2V resources comprises:

sending a first indication message to the second user equipment instructing the second user equipment to release the occupied V2V resource in the first resource pool when a V2V resource in the first resource pool is occupied by the second user equipment; and allocating the V2V resource to the first user equipment from the V2V resource released by the second user equipment.

11. The non-transitory, computer readable medium according to claim 9, further comprising:

sending a second indication message to the second user equipment, instructing the second user equipment to obtain, according to a location information of the V2V resource, the V2V resource from other V2V resources rather than the V2V resource allocated to the first user equipment in the second resource pool, wherein the second indication message carries location information of the V2V resource allocated to the first user equipment in the second resource pool.

12. The non-transitory, computer readable medium according to claim 9, further comprising:

sending a fourth indication message to the second user equipment, instructing the second user equipment to obtain, according to location information of the V2V resource, the V2V resource from the second resource pool after the first user equipment releases the occupied V2V resource in the second resource pool, wherein the fourth indication message carries location information of the V2V resource released by the first user equipment.

* * * * *